United States Patent
Dawson

(10) Patent No.: US 11,271,330 B2
(45) Date of Patent: Mar. 8, 2022

(54) POWER DISTRIBUTION ASSEMBLY WITH BOLTLESS BUSBAR SYSTEM

(71) Applicant: ROYAL PRECISION PRODUCTS LLC, Carol Stream, IL (US)

(72) Inventor: James Dawson, Carol Stream, IL (US)

(73) Assignee: Royal Precision Products, LLC, Carol Stream, IL (US)

( * ) Notice: Subject to any disclaimer, the term of this patent is extended or adjusted under 35 U.S.C. 154(b) by 0 days.

(21) Appl. No.: 17/381,897

(22) Filed: Jul. 21, 2021

(65) Prior Publication Data

US 2021/0351523 A1    Nov. 11, 2021

Related U.S. Application Data

(63) Continuation of application No. PCT/US2020/014484, filed on Jan. 21, 2020.
(Continued)

(51) Int. Cl.
*H01R 4/48*      (2006.01)
*B60R 16/023*    (2006.01)
*H01R 103/00*    (2006.01)

(52) U.S. Cl.
CPC ............ *H01R 4/48* (2013.01); *B60R 16/023* (2013.01); *H01R 2103/00* (2013.01); *H01R 2201/26* (2013.01)

(58) Field of Classification Search
CPC ............ H01R 13/052–057; H01R 4/48; H01R 2103/00; H01R 2201/26; B60R 16/023
(Continued)

(56) References Cited

U.S. PATENT DOCUMENTS

| 4,922,068 A | 5/1990 | Bangs |
| 5,393,951 A | 2/1995 | Kasper |

(Continued)

FOREIGN PATENT DOCUMENTS

| CN | 203193080 | 9/2013 |
| CN | 107863610 | 3/2018 |

(Continued)

OTHER PUBLICATIONS

DW07 Series High-current Busbar Connector Product Information Module; Japan Aviation Electronics Industry, Ltd.; 2016 (14 pages).
(Continued)

*Primary Examiner* — Gary F Paumen
(74) *Attorney, Agent, or Firm* — Barnes & Thornburg LLP

(57) ABSTRACT

A power distribution assembly with boltless busbar system for electrically and mechanically connecting a component to a power source is disclosed. The power distribution assembly includes an interconnecting busbar segment that connects two boltless busbar system together. Each boltless busbar system includes a male busbar assembly and a female busbar assembly. The male busbar assembly includes a male terminal, internal spring member, internal male housing, and external male housing that receives an extent of the male terminal, the internal spring member, and the internal male housing. This male terminal includes a side wall arrangement that defines a receiver and further includes at least one contact arm. An internal spring member with at least one spring arm resides within the male terminal receiver. The female busbar assembly includes a female terminal with a receptacle that is dimensioned to receive both the male terminal and the spring member in a connected position to secure the female busbar assembly to the male busbar assembly.

17 Claims, 23 Drawing Sheets

Related U.S. Application Data

(60) Provisional application No. 62/795,015, filed on Jan. 21, 2019.

(58) Field of Classification Search
USPC .......................................................... 439/825
See application file for complete search history.

(56) References Cited

U.S. PATENT DOCUMENTS

| | | | |
|---|---|---|---|
| 6,264,510 B1 | 7/2001 | Onizuka | |
| 6,390,830 B1 | 5/2002 | Onizuka | |
| 6,646,222 B1 | 11/2003 | Burlingame | |
| 6,722,926 B2 | 4/2004 | Chevassus-More | |
| 7,175,488 B2 | 2/2007 | Pavlovic | |
| 7,568,921 B2 | 8/2009 | Pavlovic | |
| 7,613,003 B2 | 11/2009 | Pavlovic | |
| 7,766,706 B2 | 8/2010 | Kawamura | |
| 8,366,497 B2 | 2/2013 | Glick | |
| 8,388,389 B2 | 3/2013 | Costello | |
| 8,475,220 B2 | 7/2013 | Glick | |
| 8,859,897 B2 | 10/2014 | Hadi et al. | |
| 8,911,250 B2 | 12/2014 | Ehlen | |
| 8,956,190 B2 | 2/2015 | Natter | |
| 9,033,748 B2 | 5/2015 | Ramey | |
| 9,077,114 B2 | 7/2015 | Oh | |
| 9,105,912 B2 | 8/2015 | Zhao | |
| 9,225,116 B2 | 12/2015 | McKibben | |
| 9,257,804 B1 | 2/2016 | Beck | |
| 9,300,069 B2 | 3/2016 | Morello | |
| 9,318,734 B2 | 4/2016 | Zhao | |
| 9,356,394 B2 * | 5/2016 | Kennedy | H01R 13/641 |
| 9,379,489 B2 | 6/2016 | Ebisawa | |
| 9,502,783 B2 | 11/2016 | Bleicher | |
| 9,525,254 B2 | 12/2016 | Chen | |
| 9,608,369 B1 | 3/2017 | Brandt | |
| 9,948,044 B2 | 4/2018 | Harris, III | |
| 10,003,112 B1 | 6/2018 | Boor | |
| 10,044,126 B2 | 8/2018 | Krebs | |
| 10,122,004 B2 | 11/2018 | De Souza | |
| 10,122,117 B2 | 11/2018 | Miller | |
| 10,135,168 B2 * | 11/2018 | Pavlovic | H01R 13/03 |
| 10,164,366 B2 | 12/2018 | Kataoka | |
| 2002/0081888 A1 | 6/2002 | Regnier | |
| 2002/0180272 A1 | 12/2002 | Yuasa | |
| 2007/0149050 A1 | 6/2007 | Oka | |
| 2015/0004852 A1 | 1/2015 | Hildebrand | |
| 2015/0162706 A1 | 6/2015 | Kennedy | |
| 2016/0308187 A1 | 10/2016 | Subramanian | |
| 2016/0308455 A1 | 10/2016 | Ratadiya | |
| 2018/0145428 A1 | 5/2018 | Meyer | |
| 2018/0175535 A1 | 6/2018 | Sato | |
| 2018/0191095 A1 | 7/2018 | Pavlovic | |
| 2018/0219305 A1 | 8/2018 | Wavering | |
| 2018/0269454 A1 | 9/2018 | De Souza | |
| 2019/0006652 A1 | 1/2019 | Kim | |
| 2019/0044120 A1 | 2/2019 | Ota | |
| 2019/0044197 A1 | 2/2019 | Ota | |

FOREIGN PATENT DOCUMENTS

| | | |
|---|---|---|
| CN | 108923007 | 11/2018 |
| DE | 19817924 | 10/1999 |

OTHER PUBLICATIONS

Busbar Connectivity Quick Reference Guide; TE Connectivity Ltd.; 2017 (7 pages).
International Search Report and Written Opinion issued in PCT/US20/50016, dated Nov. 30, 2020, 14 pages.
International Search Report and Written Opinion issued in PCT/US20/50018, dated Nov. 30, 2020, 14 pages.
International Search Report and Written Opinion issued in PCT/US20/14484, dated Mar. 31, 2020, 7 pages.

* cited by examiner

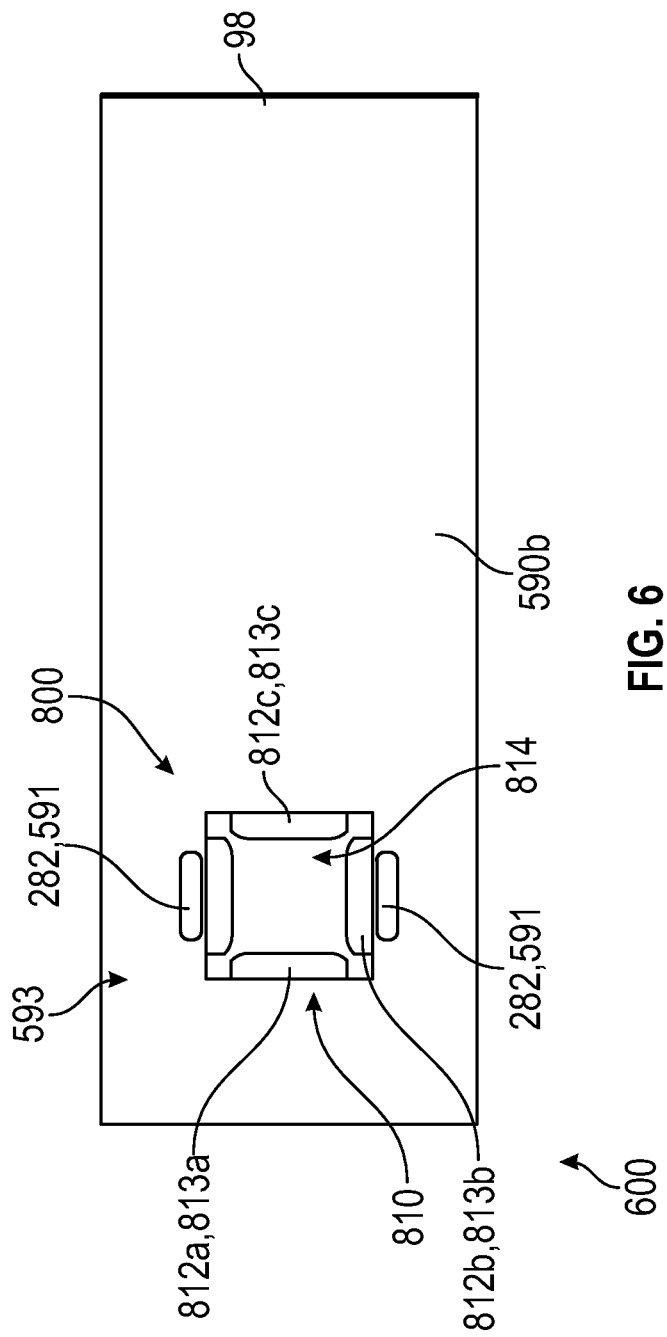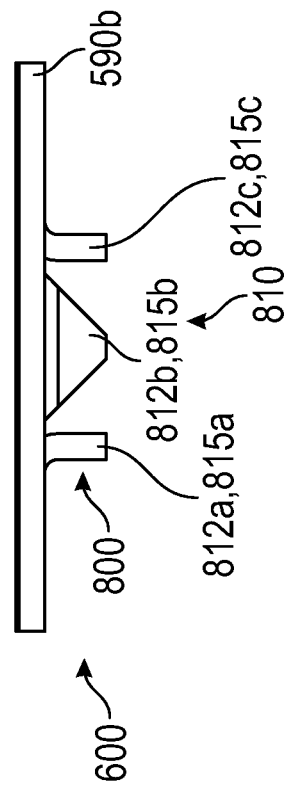

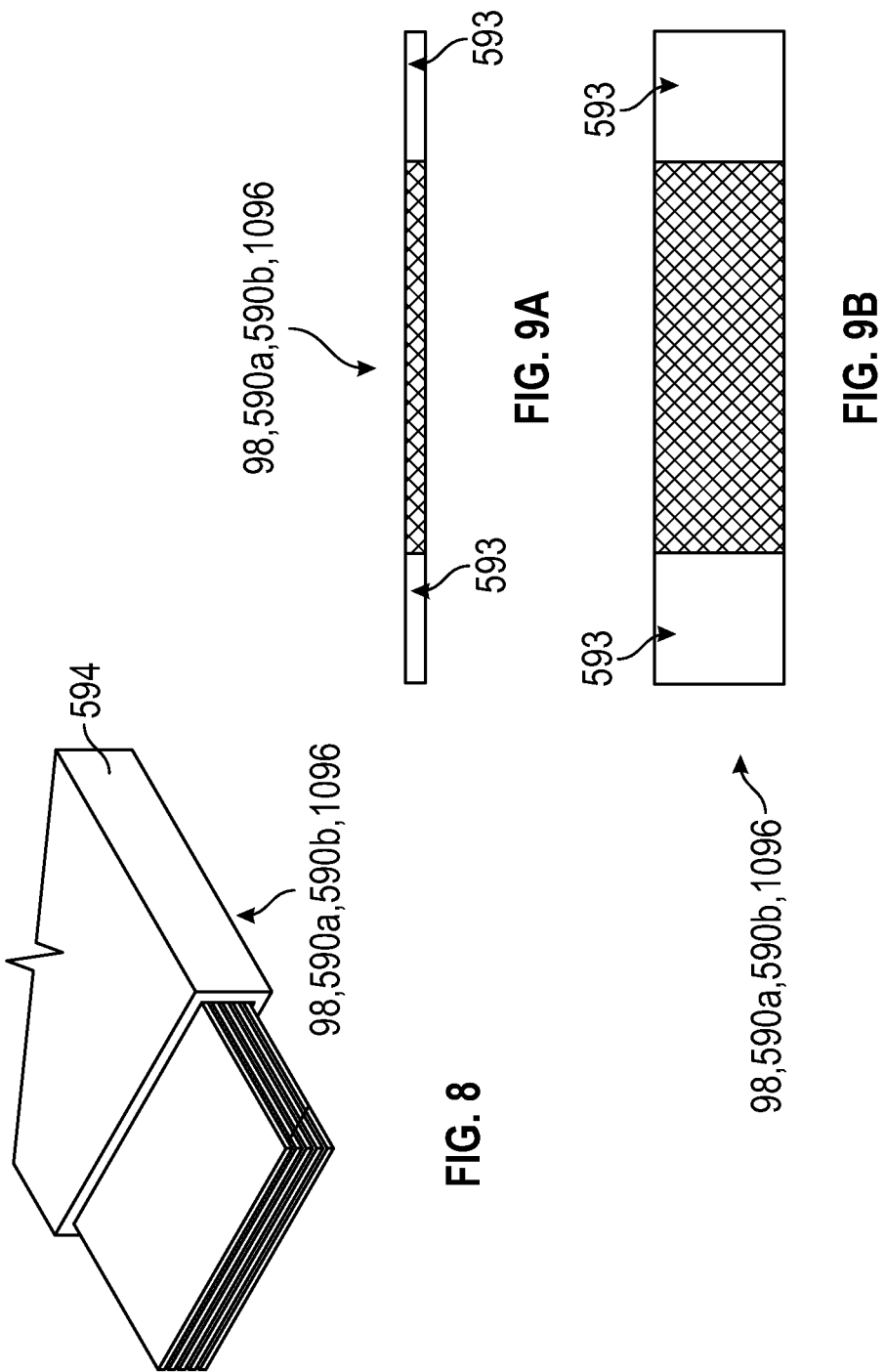

POWER DISTRIBUTION ASSEMBLY WITH BOLTLESS BUSBAR SYSTEM

CROSS-REFERENCE TO RELATED APPLICATIONS

This application is a Continuation of copending International Patent Application No. PCT/US2020/014484, filed Jan. 21, 2020, which claims the benefit of U.S. Provisional Patent Application No. 62/795,015, filed on Jan. 21, 2019. The disclosures set forth in the referenced applications are incorporated herein by reference in their entireties.

FIELD OF DISCLOSURE

The present disclosure relates to power distribution assembly, and, in particular, to a power distribution assembly that includes a boltless busbar system featuring at least one electrical connector assembly with an internal spring. Specifically, the present disclosure relates to a modular power distribution assembly for use in motor vehicles, including passenger and commercial vehicles, and suitable for high-power, high-current and/or high-voltage applications.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Some of these electrical components are mechanically and electrically connected within the motor vehicle by conventional busbar assemblies, which consist of threaded fasteners. Considerable time, resources, and energy have been expended to develop connector assemblies that meet the varied needs and complexities of the motor vehicle market; however, conventional connector assemblies suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between $50 billion and $150 billion, worldwide.

In light of these challenging electrical environments, considerable time, money, and energy have been expended to find power distribution assembly that meets all of the needs of these markets. A conventional power distribution assembly uses custom fabricated busbars. By utilizing custom fabricated busbars, any alterations to the power distribution system may require altering the configuration of one or more busbars. These alterations are expensive and time-consuming Once the configuration of these custom-fabricated busbars is finalized and the busbars are manufactured, installers typically couple the busbars to power sources, power distribution assemblies, or devices utilize a combination of conventional fasteners (e.g., elongated fasteners, washers, nuts and/or studs). These conventional fasteners make installing the busbars within the application extremely difficult due to the protective equipment that an installer may be required to wear in order to protect themselves during this process. Finally, after the custom fabricated busbars are properly installed within the application, they are prone to high failure rates due to their configuration. Accordingly, there is an unmet need for an improved power distribution assembly that is boltless, modular suitable, and is suitable for use in power distribution systems found in automotive, marine and aviation applications.

This disclosure addresses the shortcomings discussed above and other problems and provides advantages and aspects not provided by conventional connector assemblies and the prior art of this type. A full discussion of the features and advantages of the present disclosure is deferred to the following detailed description, which proceeds with reference to the accompanying drawings.

SUMMARY

The present disclosure relates to a power distribution assembly for use in a broader power distribution system. The power distribution assembly includes at least one boltless busbar system with a male busbar assembly that includes: (i) a male busbar body and (ii) a spring actuated male connector assembly residing within a housing assembly. The busbar system also includes a female busbar assembly that includes (i) a female busbar body and (ii) a female connector assembly that is configured to receive an extent of the spring actuated male busbar assembly, when the busbar system is in a connected state without the use of conventional bolt and eyelet fasteners which can be expensive, difficult to work with during the installation process and too large dimensionally for certain installations or applications. The power distribution assembly is integrated into a broader power distribution system used in motor vehicles, including passenger and commercial vehicles, for high-power, high-amperage, and/or high-voltage applications. In these applications, the power distribution assembly is essential to meet industry standards, production, and performance requirements of the power distribution system and the motor vehicle. The power distribution assembly can also be used in military vehicles, such as tanks, personnel carriers and trucks, and marine applications, such as cargo ships, tankers, pleasure boats and sailing yachts, or telecommunications hardware, such as servers.

According to an aspect of the present disclosure, the boltless busbar system includes the male busbar assembly with a male connector assembly and the female busbar assembly with a female connector assembly. Both the male and female connector assemblies have a terminal. The male terminal assembly is designed and configured to fit within the female terminal, which forms both a mechanical and electrical connection between these terminals. The male terminal assembly includes an internal spring actuator or spring member, which is designed to interact with an extent of the male terminal to ensure that a proper connection is created between the male terminal and the female terminal. More specifically, the female terminal forms a receiver that is configured to receive an extent of the male terminal assembly. The male terminal assembly has a male terminal body, which includes a plurality of contact arms. A spring member is nested inside the male terminal body. The spring member resists inward deflection and applies outwardly directed force on the contact arms thereby creating a positive connection and retention force between the male and female terminals. Unlike other prior art connection systems, the connection between the male terminal and the female terminal becomes stronger when the power distribution assembly experiences elevated ambient and/or operating temperatures, electrical power and loads during operation of the power distribution system and the motor vehicle.

Additional structural and functional aspects and benefits of the power distribution system, the power distribution assembly and the boltless busbar system, including their components, are disclosed in the Detailed Description section and the Figures.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 6 is a top view of the female busbar assembly of FIG. 5;

FIG. 7 is a side view of the female busbar assembly of FIG. 5;

FIG. 8 is a perspective view of a first embodiment of a busbar body;

FIGS. 9A-9B are various views of a second embodiment of a busbar body;

DETAILED DESCRIPTION

Figure 1:
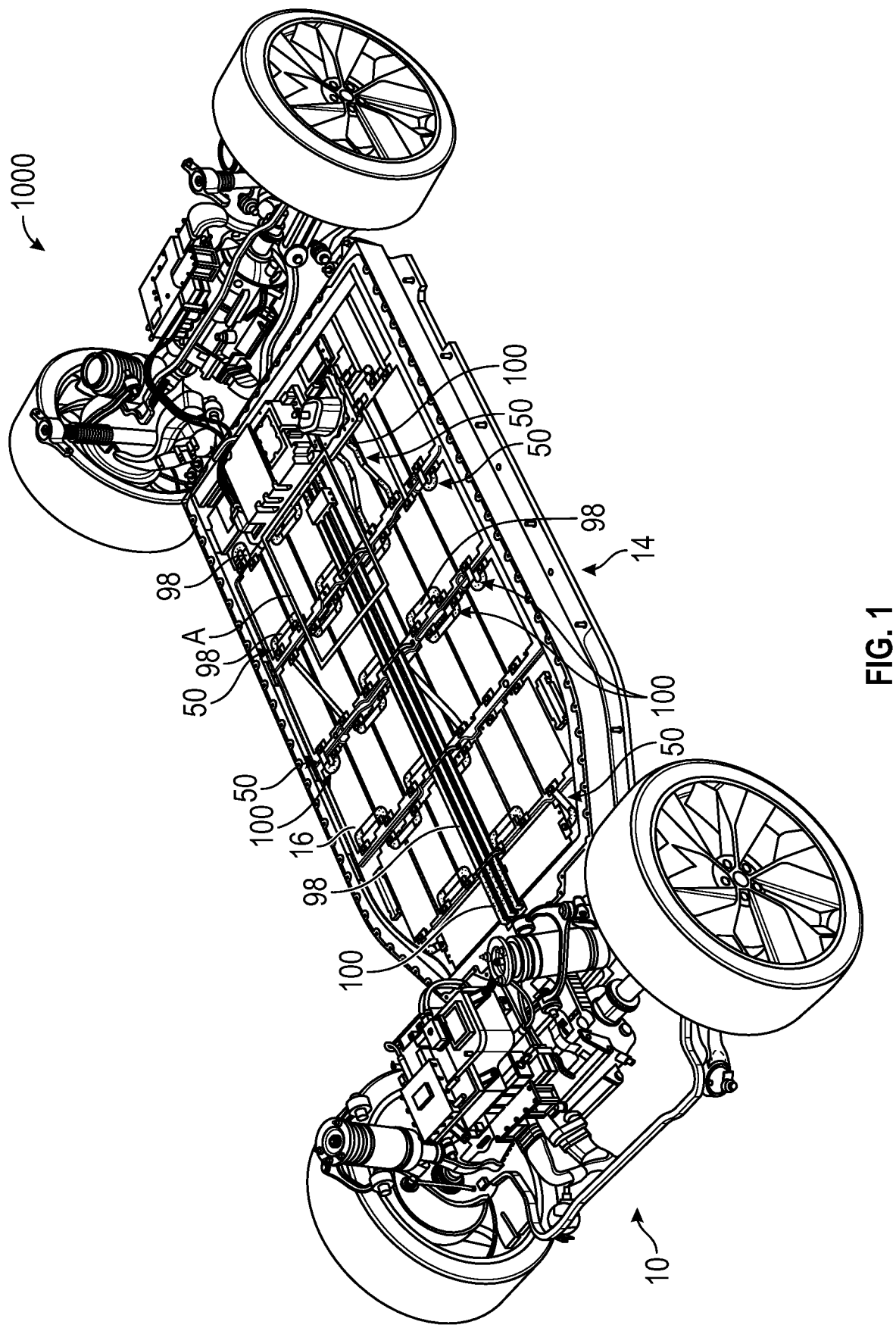
FIG. 1 is a perspective view of an exemplary motor vehicle environment that includes a power distribution system with a plurality of power distribution assemblies.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. As such, one or more steps from the flow charts or components in the Figures may be selectively omitted and/or combined consistently with the disclosed methods and systems. Accordingly, the drawings, flow charts and detailed descriptions are to be regarded as illustrative in nature, not restrictive or limiting.

The Figures show a power distribution assembly 50, which is designed to mechanically and electrically couple: (i) power sources (e.g., alternator or battery) to one another and (ii) a power source to a power distribution/control component or (iii) a power source to a device (e.g., radiator fan, heated seat, power distribution component, or another current drawing component). The power distribution assembly 50 may be used within a power distribution system 10, which may be installed within an airplane, motor vehicle 1000, a military vehicle (e.g., tank, personnel carrier, heavy-duty truck, and troop transporter), a bus, a locomotive, a tractor, a boat, a submarine, a battery pack, a 24-48 volt system, for a high-power application, for a high-current application, for a high-voltage application. In these applications, the power distribution assembly 50 is essential to meet industry standards, production, and performance requirements of the power distribution system 10 and the motor vehicle. It should be understood that multiple power distribution assemblies 50 can be used in a single application. For example, a number of power distribution assemblies 50 can be used in connection with various devices and components contained within a single motor vehicle, as shown in FIG. 1.

Figure 2:
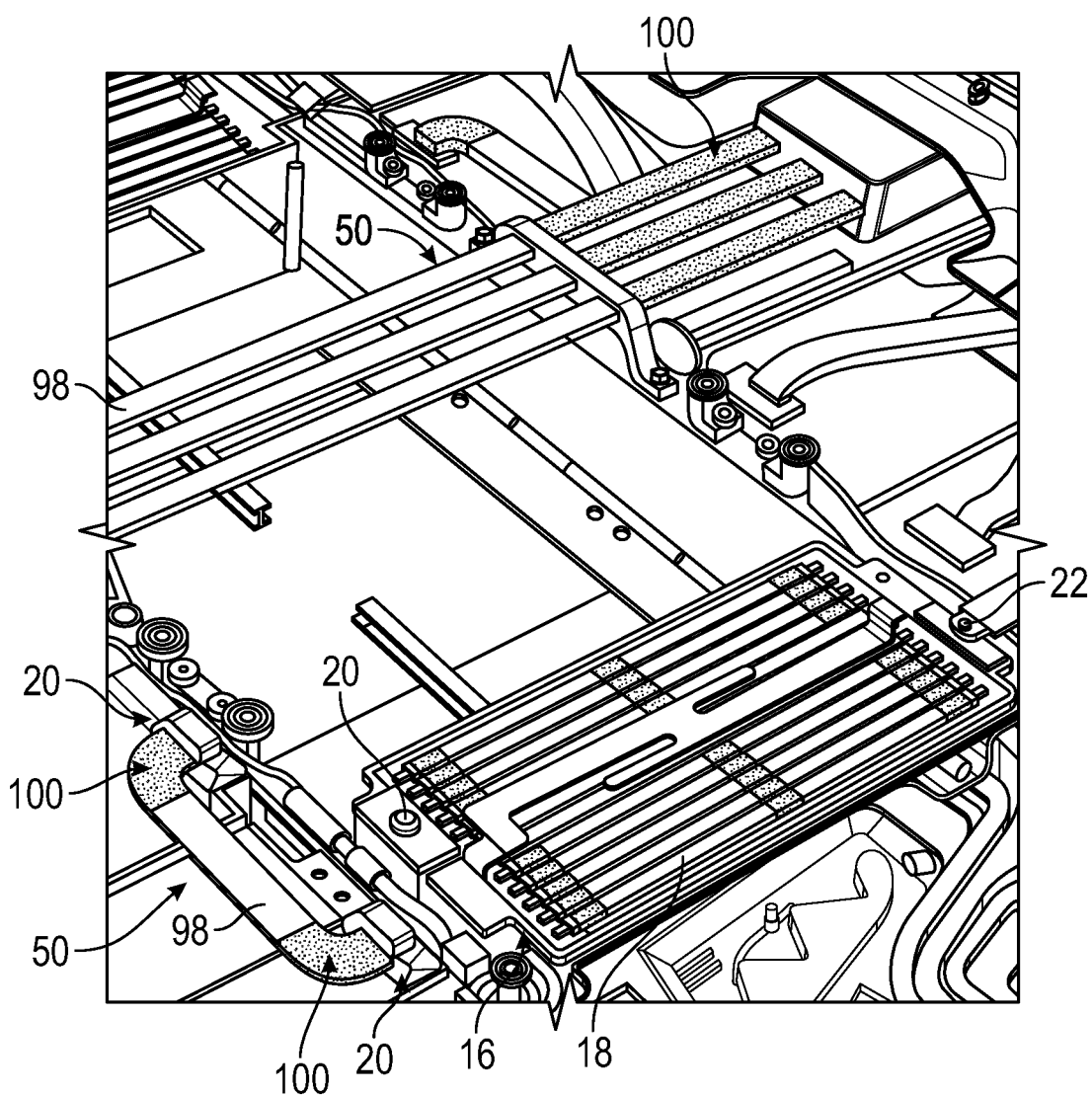
FIG. 2 is a zoomed-in view of area A of the motor vehicle environment of FIG. 1.

FIGS. 1-2 show a motor vehicle environment that includes a power distribution system 10 that includes a number of components, such as a charger, a battery pack assembly 14, a DC-DC converter, and an electrical motor. As shown in FIGS. 1 and 2, the battery pack assembly 14 has a skateboard configuration, wherein the battery pack assembly 14 has a plurality (e.g., 36) of battery pack modules 16 that are arranged in a substantially linear configuration that is positioned at or below vehicle axle level and below a majority of the motor vehicle body (not shown), when installed. The battery pack modules 16 are formed from a plurality (e.g., 12) of cells 18, wherein the cells 18 are coupled to one another to form a positive terminal 20 and a negative terminal 22 for each battery pack module 16. The positive terminals 20 of these battery pack modules 16 are coupled to one another (e.g., in parallel and in series) using power distribution assemblies 50 in order to create a battery pack 14 that supplies proper voltage levels for operation of the motor vehicle 1000. Like the positive terminals 20, the negative terminals 22 are similarly coupled together using the power distribution assemblies 50.

As shown in FIGS. 3-17, the power distribution assemblies 50 typically include: (i) two busbar systems 100 and (ii) an interconnecting busbar segment 98 that extends between the two systems 100. The busbar systems 100 are comprised of: (i) a male busbar assembly 200 and (ii) a female busbar assembly 600. The male busbar assembly 200 includes a male busbar body 590a and a male housing assembly 220 that substantially encases the male terminal assembly 430. The male terminal assembly 430 replaces at least one of the conventional threaded bolt that is utilized to couple busbars to other components (e.g., other busbars or devices). In other words, at least an extent of the busbar system 100 is boltless or lacks a conventional threaded fastener. The male housing assembly 220 is designed to: (i) facilitate the coupling of the male terminal assembly 430 with an extent of the female terminal 800, (ii) minimize the chance that male terminal assembly 430 accidentally makes electrical contact with another device or component of vehicle 1000, and (iii) meet industry standards, such as USCAR specifications. As shown in FIGS. 3-4, 10-11, 14-22, and 26-28, the male busbar assembly 200 may also include a cable strain relief component 530. In alternative embodiments, the busbar system 100 may include a connector position assurance assembly ("CPA"), which is designed to enable the busbar system 100 to meet USCAR Specifications, including USCAR-12, USCAR-25, and USCAR-2. For example, the male housing 220 may include a CPA assembly that includes a projection that is received by an opening within the female busbar body 590b. Additionally, details and other examples of CPA assemblies are disclosed within PCT Application PCT/US2019/36127, which is incorporated herein by reference. The cable strain relief component 530 and CPA assembly may be omitted completely or replaced with different components. For example, the cable strain relief component 530 may be omitted due to the configuration (e.g., length, rigidity, positioning, or etc.) of the male busbar body 590a.

Referring to FIGS. 4-7, the female busbar assembly 600 includes a female terminal assembly 800 and a female busbar body 590b, wherein the female busbar body 590b is mechanically and electrically connected to the interconnecting busbar segment 98. In some embodiments, the female busbar body 590b is integrally formed with the interconnecting busbar segment 98, which allows a designer/fabricator to form these two components from single, elongated pre-manufactured busbar. Additional details about this fabrication process are described below. Like the male busbar assembly 200, the female busbar assembly 600 may also include a touch proof probe. The touch proof probe is described in greater detail within PCT/US2019/36127 and PCT/US2019/36010, both of which are incorporated herein by reference. As discussed above, the touch proof probe is an optional component that may be omitted completely or replaced with different components.

Referring to FIGS. 1-30, the power distribution assembly 50 disclosed herein does not utilize bolts, screws, fasteners, or the like to connect at least an extent of a busbar to: (i) power sources (e.g., alternator or battery) to one another and (ii) a power source to a power distribution/control component or (iii) a power source to a device (e.g., radiator fan, heated seat, power distribution component, or another current drawing component). This enables the system to be assembled in an efficient manner in comparison to the conventional bolted busbar designs. For example, a conventional busbar design requires the manufactures to have a first-person torque the bolts onto the busbar and then a second person checks the torque of the bolts. In contrast, the busbar system 100 only requires a single person to force the male connector assembly 200 into the female connector assembly 600, hear the click of the barbs 287 locking into place, tug on the connector assemblies to ensure they are properly coupled together, and scan an extent of the system (push, click, tug, scan—"PCTS" compliant). In other words, the male busbar assembly and the female busbar assembly can be coupled to one another by the installer without the use of a separate tool. Not only labor cost is reduced because it only takes one person a shorter amount of time, but also it requires less space and is more durable than conventional busbars bolts.

Busbar system 100 is unlike floating busbars because the system 100 can be utilized within harsh environments that are subject to significant vibrations. Specifically, floating busbar systems typically must be used in environments that do not experience significant vibrations because the busbar will be shaken loose from the connectors that they resided within. Also, unlike the busbar system 100, the floating busbars typically do not permit large elevation changes or angular changes between connectors. Accordingly, the busbar system 100 overcomes these significant limitations that are associated with floating busbars.

Additionally, the power distribution assembly 50 provides a modular and customizable design, which: (i) permits changes without creating new molds or bending processes, (ii) allows for the formation of the power distribution assembly 50 during production of an installation environment (e.g., the busbar does not have to be custom fabricated prior to production), and (iii) the power distribution assembly 50 can be shipped flat and unassembled, which saves on space that is required for shipping and reduces the probability that a busbar will be damaged prior to installation. For example, the male busbar body and the female busbar body are capable of being disconnected from one another and shipped in a configuration where the male busbar body and the female busbar body are substantially co-plainer with one another. Instead of fabricating custom busbars, a designer to alter: (i) the length of the busbars by changing where the female terminals are created, (ii) the angle of the connecting busbars by changing the angle of the female terminals, and (iii) can alter which sections are rigid and which sections are flexible. For example, the power distribution assembly 50 can utilize an interconnecting busbar segment 98 that is a rigid busbar formed from a single conductor and a male busbar body 590a that is a flexible busbar formed from a plurality of conductors. This combination of rigid busbars and flexible busbars provides the stability needed within the power distribution assembly 50, while allowing the flexible busbars to overcome elevations changes, angular changes, and absorb vibrations within the system.

Figure 3:
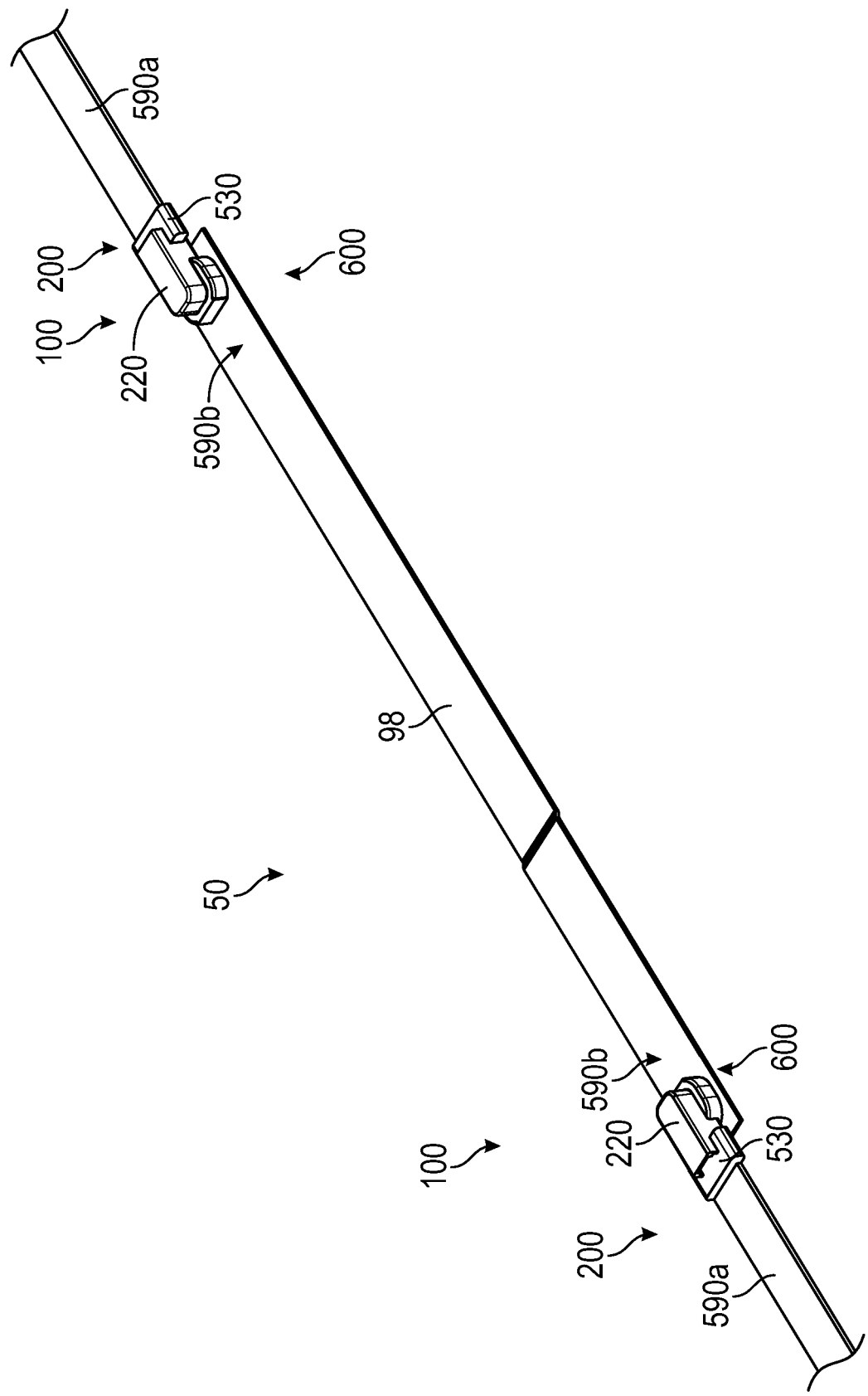
FIG. 3 is a perspective view of a first embodiment of a power distribution assembly shown in FIGS. 1 and 2, where the power distribution assembly includes two interconnected busbar systems.
Figure 4:
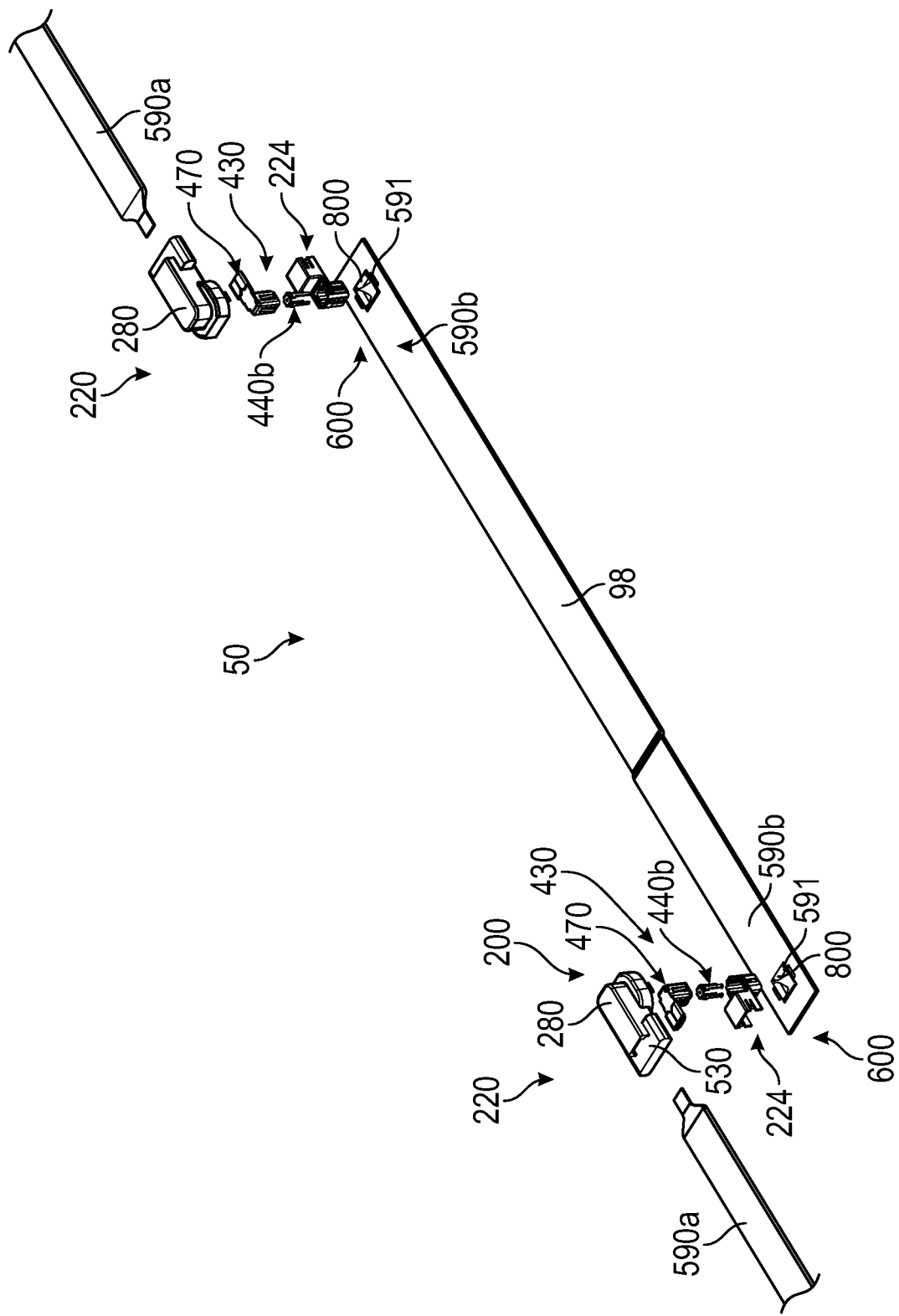
FIG. 4 is an exploded view of the busbar systems of FIG. 3, wherein each busbar systems include a male busbar assembly and a female busbar assembly.

The modular design is highlighted by the fabrication process of the power distribution assembly 50. The first step in fabricating the assembly 50 is shown in FIG. 3 is to acquire busbar materials. These busbar materials may include two different types of materials, wherein the first material may be a single conductor that is coated with a protective layer and a second material may be multiple conductors that are stacked together and coated with protective material. The second step is to place the first material within a punch and to form two sets of holes at: (i) the desired distance apart from one another and (ii) at the desired angle. The formation of the holes creates the female terminals 800. The third step involves assembling the male terminal assembly 430, coupling the male terminal assembly 430 to the male busbar body 590a, and fully seating the interior housing 224 within the exterior housing 280. The fourth step is to couple the male busbar assembly 200 to the female busbar assembly 600 using a downward directed force. Once the male terminal assembly 430 is coupled to the female terminal 800, the fabrication of the power distribution assembly 50 is finalized. From the above steps, it should be clear that an endless number of power distribution assemblies 50 can be created by changing the distance between the formation of the female terminals 800 or changing the angle of the female terminals 800.

It should be understood that these terms, as used herein, shall generally mean the following. "High power" shall mean an application experiencing: (i) a voltage of between 20 volts to 600 volts, regardless of the current or (ii) a current greater than or equal to 80 amps, regardless of the voltage. "High current" shall mean current greater than or equal to 80 amps, typically greater than 80 amps in the automotive industry, regardless of the voltage. "High voltage" shall mean between 20 volts to 600 volts, typically greater than 47 volts in the automotive industry, regardless of the current.

I. Female Connector Assembly

FIGS. 3-17 provide various views of the female busbar assembly 600. The female busbar assembly 600 includes: (i) a female busbar body 590b, and (ii) a female terminal 800. The female busbar body 590b may have different configurations and/or compositions. For example, the female busbar body 590b may include: (i) a single solid conductor, (ii) a plurality (e.g., between 2 and 100) of solid conductors (see FIG. 8), (iii) a single braided conductor (see FIGS. 9A-9B), (iv) a plurality (e.g., between 2 and 30) of braided conductors, (v) a plurality (e.g., between 2 and 100) of solid connectors, where each connector includes an extent that interacts with another solid connector, or (vi) any busbar configuration that is known in the art. It should be understood that the busbars body 590b may be made from any suitable material, including stainless steel, nickel, aluminum, silver, gold, copper, nickel-plated copper, steel, zinc, brass, bronze, iron, platinum, lead, tungsten, lithium, tin, a combination of the listed materials, or other similar metals. For example, the busbar body 509b may include six layers, wherein the layers alternate between copper and aluminum. Also, depending on the material type/properties and configuration of the busbar body 590b, the busbar body 509b may be either rigid (e.g., a small extent cannot typically be bent by hand) or flexible (e.g., a small extent can typically be bent by hand). For example, a busbar body 509b that contains a single solid connector is typically rigid and a busbar body 509b that contains braided connectors is typically flexible.

Figure 5:
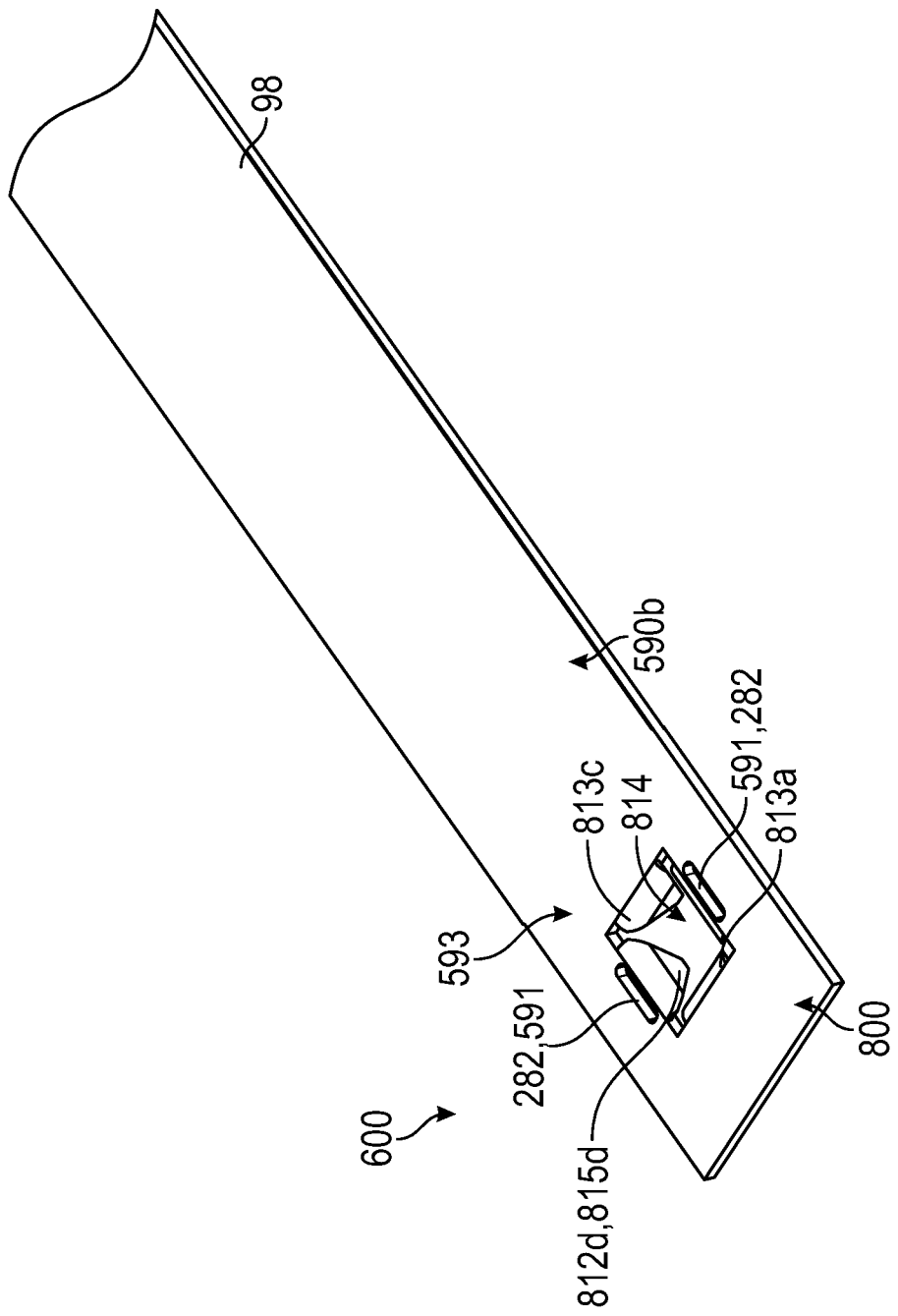
FIG. 5 is a perspective view of the female busbar assembly of FIG. 3 showing a female terminal assembly and a female busbar body.
Figure 10:
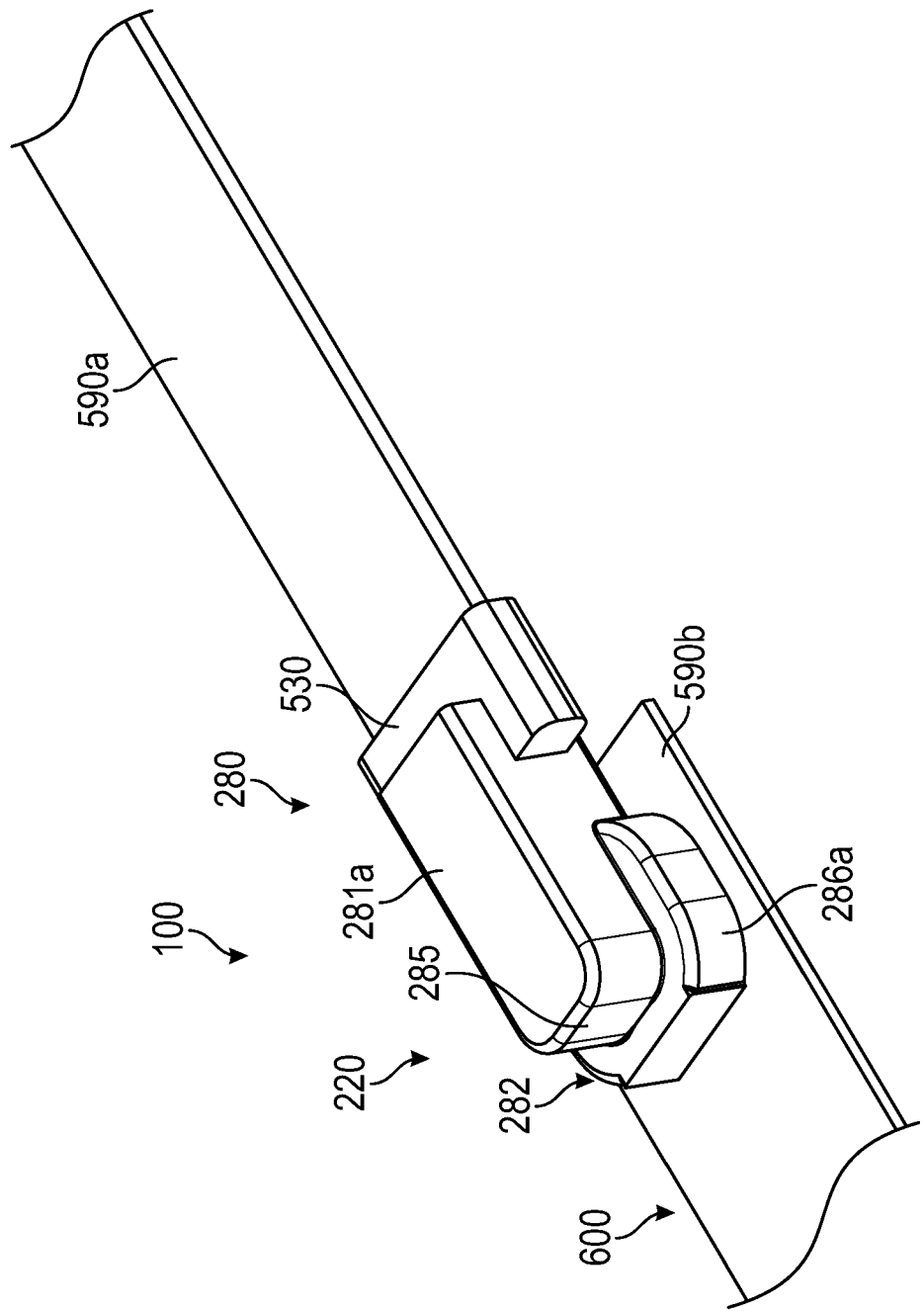
FIG. 10 is a perspective view of one of the busbar systems of FIG. 3.

If the female busbar body 590b contains a plurality of conductors, the female busbar body 590b has an integrally formed mounting portion 593 that couples the plurality of conductors into a single conductor. This mounting portion 593 is typically a solid single conductor that facilitates the electrical and mechanical coupling of the busbar body 590b to another component. Specifically, this electrical and mechanical coupling is facilitated by the female terminal 800 and a first part of the busbar body coupling means 282. In the embodiments shown in the Figures, the first part of the busbar body 590b coupling means 282 includes female coupling holes 591, which are formed within this mounting portion 593. The female coupling holes 591 are configured to interact with a second extent of the busbar body 590b coupling means 282 in order to couple the male housing 220 with the busbar body 590b (see FIG. 16). As shown in FIGS. 5-7, the female coupling holes 591 may be positioned adjacent to the female terminal 800. Alternatively, the female coupling holes 591 may be placed a distance away from the female terminal 800 to help ensure that the holes 591 do not affect the durability and strength of the busbar body 590b. In other embodiments, the busbar body 590b coupling means 282 may include or be replaced by other structures that utilize magnetic forces, spring forces, material biasing forces, compression forces or a combination of these forces.

As shown in FIG. 8, the female busbar body 590b may also include a protective layer 594 that substantially envelops the body 590b. The protective layer 594 may act as an insulator, which isolates the current that is configured to flow through the busbar bodies 590a, 590b from other structures or elements contained within the environment. In other embodiments, the protective layer 594 may also include layers of non-conductive and conductive materials that are designed to reduce EMFs (e.g., shielded) that radiate from the busbar body 590b. It should be understood that the protective layer 594 must be durable enough to withstand the bending and movement of the conductors within the protective layer without allowing the conductors to cut, tear or wear through the protective layer 594.

The female busbar body 590b is mechanically and electrically connected to the interconnecting busbar segment 98. In some embodiments, the female busbar body 590b is integrally formed with the interconnecting busbar segment 98. Integrally forming the female busbar body 590b with the interconnecting busbar segment 98 allows a designer/fabricator to form these two components from a single elongated pre-manufactured busbar. For example, the female busbar body 590b may contain the mounting portion 593 and a small extent of the plurality of solid conductors, whereas the interconnecting busbar segment 98 only includes the plurality of solid conductors and a protective coating 594.

A. Female Terminal

FIGS. 4-7, 11, and 16-17, provide various views of the female terminal 800. The female terminal 800 includes a female terminal body 810. The female terminal body 810 is comprised of a plurality of angular segments (e.g., triangles) 815a-815d that form an arrangement of female terminal side walls 812a-812d. Specifically, one female terminal side wall 812a of the arrangement of female terminal side walls 812a-812d is: (i) substantially parallel with another one female terminal side wall 812c of the arrangement of female terminal side walls 812a-812d and (ii) substantially perpendicular to two female terminal side wall 812b, 812d of the arrangement of female terminal side walls 812a-812d. The female terminal body 810 defines a female terminal receiver 814. The female terminal receiver 814 is designed and configured to be coupled, both electrically and mechanically, to an extent of the male terminal 470, when the male terminal 470 is inserted into the female terminal receiver 814.

The female terminal 800 is formed within the mounting portion 593 of the busbar body 590b. Specifically, in the first embodiment that is shown in FIGS. 3-17, a punch or other similar machine can be utilized to press triangular-shaped extents 315a-315d from the busbar body 590b to form the female terminal 800. In contrast, in the second embodiment that is shown in FIGS. 18-28, a drawing method is utilized to form the female terminal side walls 812a-812d. Each of these methods has its own benefits, where the punch is less expensive while the drawing method is more robust. It should be understood that other methods of forming the female terminal 800 from the female busbar body 590b are contemplated by this disclosure, including additive manufacturing or a combination of the methods disclosed herein. By forming the terminal 800 from busbar body 590b, the female terminal 800 includes arched side walls 813a-813d. The arched side walls 813a-813d couple either: (i) the triangular shaped extends 815a-815d to the linear extent of the busbar body 590b (see FIGS. 3-17) or (ii) the rectangular receiver (see FIGS. 18-28). The arched side walls 813a-813d facilitate the compression of the contact arms 494a-494d, which will be disclosed in greater detail below. In certain embodiments that arched side walls 813a-813d may be coated with a substance to reduce the amount of friction that is created by sliding the metal contact arm 494a-494d on the metal arched side walls 813a-813d. For example, a high-temperature polymer may be utilized.

By forming the terminal 800 from busbar body 590b, the female terminal 800 is integrally formed with the busbar body 590b. This reduces the need for additional materials or components, increases the durability, and allows for the busbar body 590b to be manufactured in a time-efficient manner Further, forming the female terminal 800 from the busbar body 590b obviates the need for a separately formed female housing. This is beneficial because it reduces the part count and cost of the female busbar assembly 600 and the height requirements of the system 100. However, it should be understood that in other embodiment the female terminal 800 may be formed in a separate process and may be coupled to the busbar body 590b. For example, the terminal 800 may be formed using any known method, such as casting or using an additive manufacturing process (e.g., 3D printing).

II. Male Busbar Assembly

Figure 27:
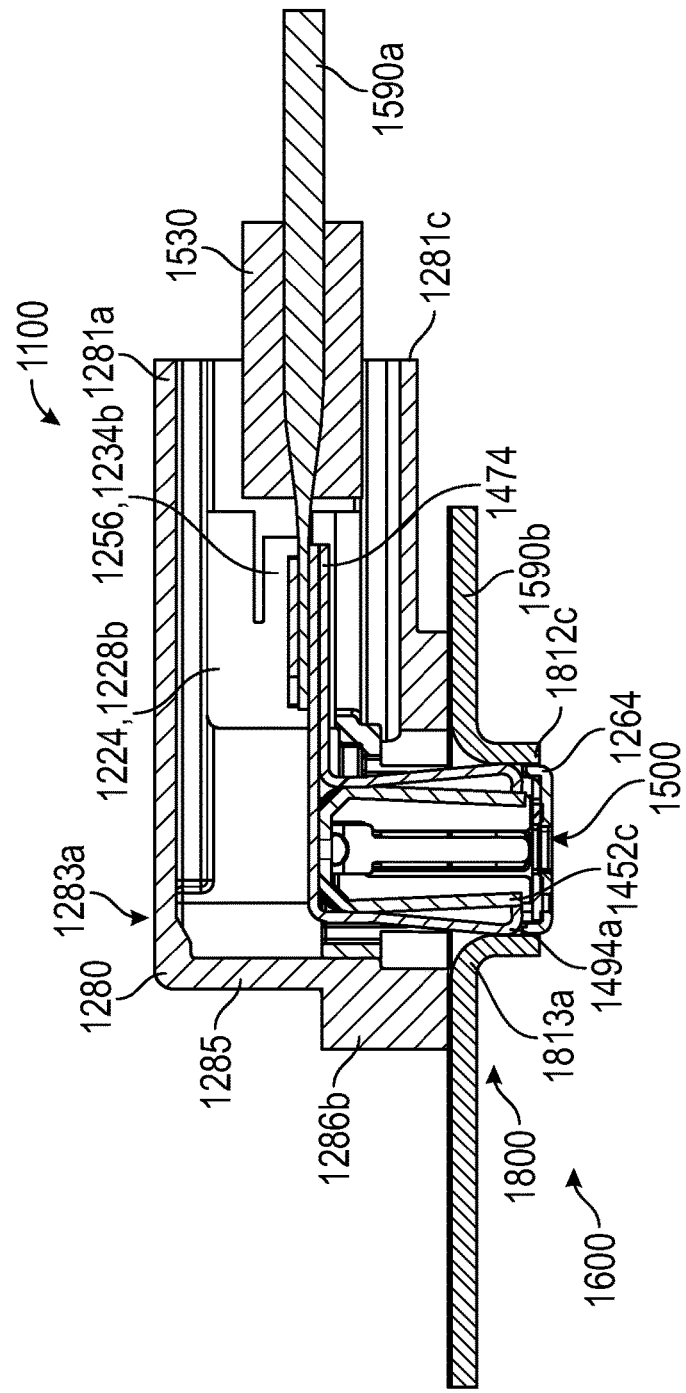
FIG. 27 is a cross-sectional view of the busbar system taken along line 27-27 of FIG. 26.
Figure 28:
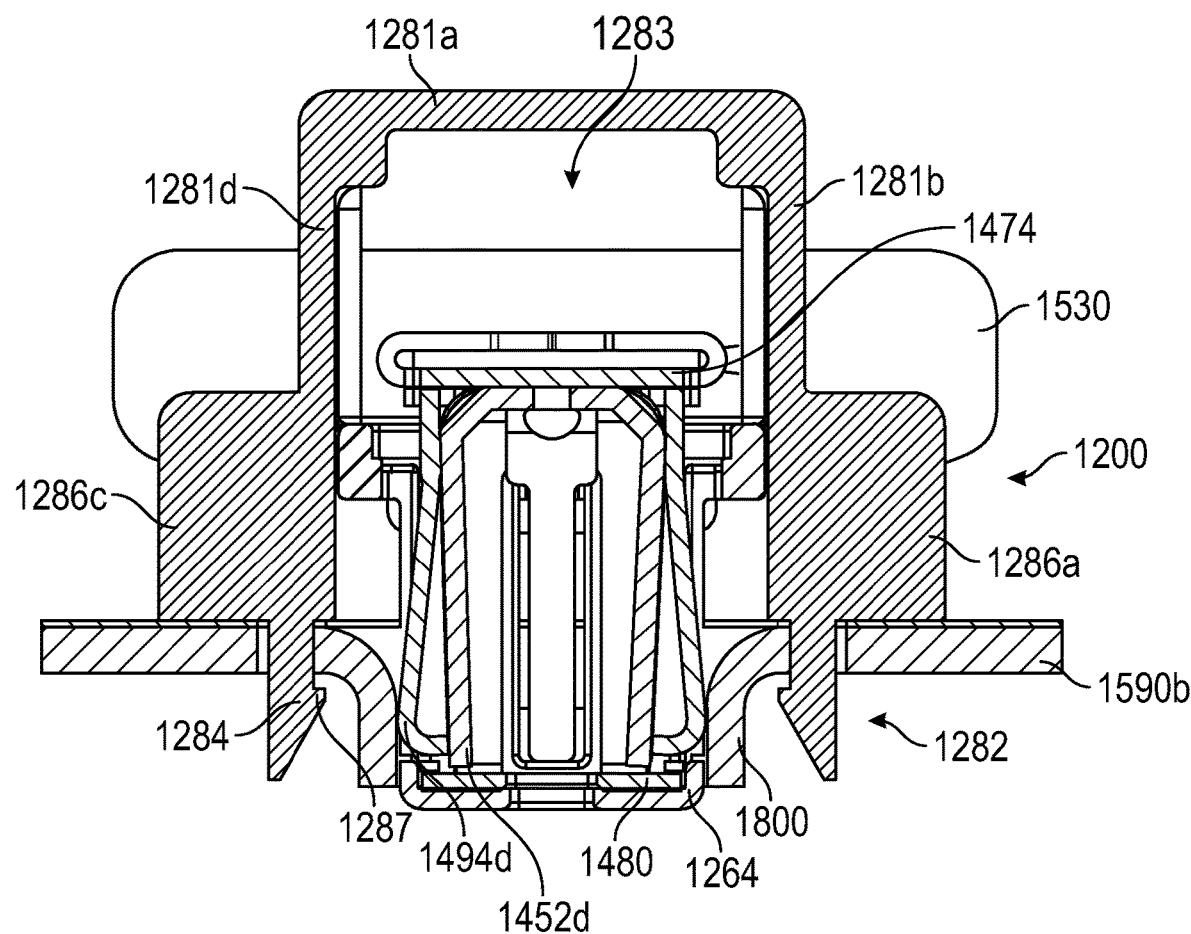
FIG. 28 is a cross-section view of the busbar system taken along line 28-28 of FIG. 26.
Figure 29:
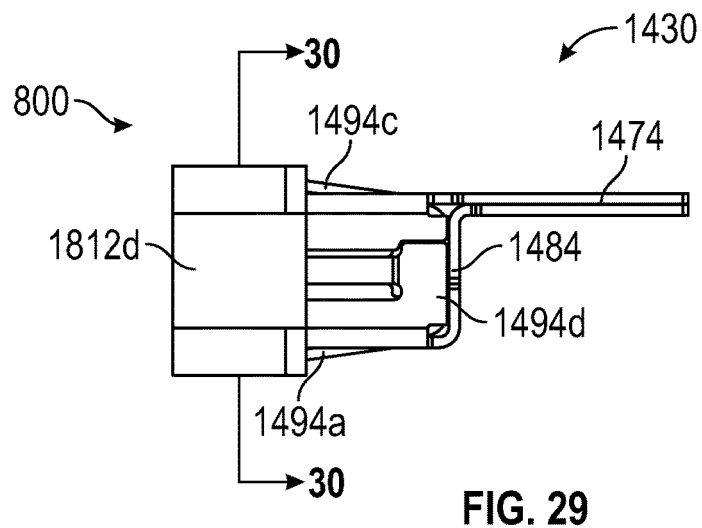
FIG. 29 is a side view of the female and male terminals of the busbar system of the power distribution assembly.
Figure 30:
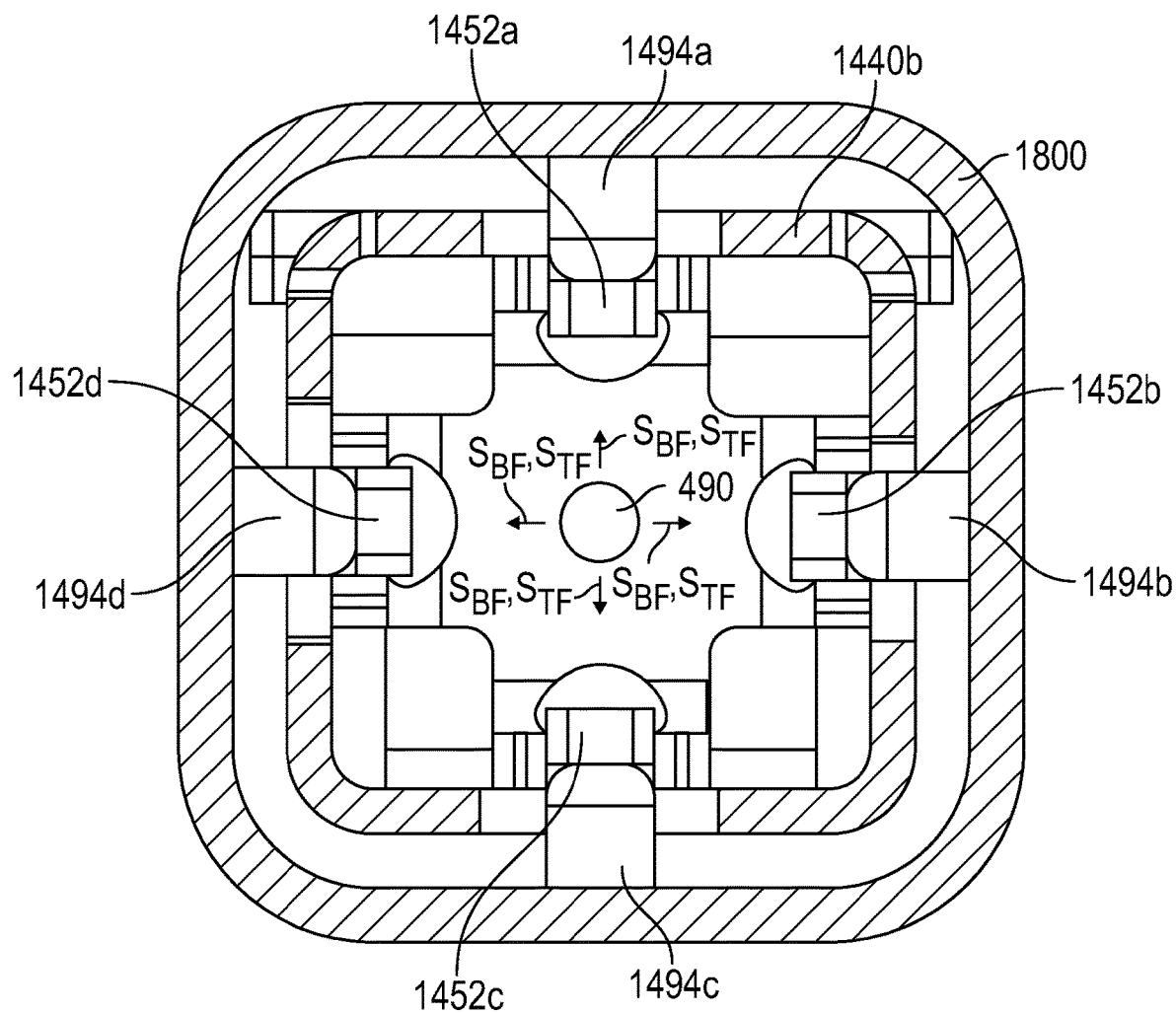
FIG. 30 is a cross-section view of the female and male terminals taken along line 30-30 of FIG. 29.

FIGS. 3-4, 10-22, and 26-38 provide various views of the male busbar assembly 200 of the busbar system 100. The male busbar assembly 200 includes: (i) the male housing assembly 220, (ii) the male terminal assembly 430, (iii) male busbar body 590a. The male housing assembly 220 includes the internal male housing 224 and exterior male housing 280. Both the internal male housing 224 and the external male housing 280 have complex geometries with a number of cooperatively positioned and dimensioned recesses, projections, and openings therethrough to allow for the insertion of the internal male housing 224 within the external male housing 280. As shown in FIGS. 17 and 27, the external male housing 280 encases a majority of the internal male housing 224, including where the male terminal assembly 430 is coupled to the male busbar body 590a.

A. External Male Housing

As shown in FIGS. 3-4, 10-11, 14-22, and 26-28, the external male housing 280 includes: (i) an arrangement of side walls 281a-281d, (ii) a frontal wall 285, and (ii) a busbar body coupling means 282 that is coupled to a portion of the side wall 281a-281d. The arrangement of side walls 281a-281d form a rectangular receptacle 283 that is configured to receive an extent of the internal housing 224, which is best shown in FIGS. 16, 17, 27 and 28. The frontal wall 285 is configured to enclose a frontal extent 283a of the rectangular tube 283. The second part of the busbar body coupling means 282 extends from an external surface of the side walls 281b, 281d and the front wall 285 and in certain embodiments may be integrally formed with side walls 281b, 281d and the front wall 285. The busbar body coupling means 282 includes: (i) an arrangement of side walls 286a-286c and (ii) a downwardly extending tab or projection 284 with a barb 287. The barb 287 of the busbar projection 284 is configured to secure the external male housing 280 to the female busbar body 590b. To accomplish this coupling, the busbar projection 284 is configured to extend through the female coupling holes 591 that are formed within the busbar body 580b. The tapered extent of the busbar projection 284 facilitates the alignment of the external male housing 280 with the female coupling holes 591.

Once the busbar projections 284 are inserted within the female coupling holes 591, a user will apply a sufficient amount of force to temporarily elastically deform the busbar projections 284 to allow the barbs 287 to extend into the female coupling holes 591. Once the barbs 287 have passed through the holes 287, the flexible projections 284 return to its original or un-deformed state to facilitate the coupling of the external housing 280 to the female busbar body 590b. It should be understood that the external male housing 280 is made using any known technique (e.g., injection molding techniques, 3D printing, cast, thermoformed, or etc.) from a non-conductive material. Specifically, non-conductive materials are discussed within PCT/US2019/36127, which is incorporated herein by reference.

B. Internal Male Housing

As shown in FIGS. 11, 14, 16-17, 22, and 27-28, the internal male housing 224 has: (i) a body 226 and (ii) an internal male housing receptacle 260. The body 226 includes an arrangement of walls 228a-228b that form a receiver 230 that is configured to receive an extent of the male terminal assembly 430 and the male busbar body 590a (see FIGS. 11 and 14). Side walls 228a, 228b also includes a male locking means 256, which in this exemplary embodiment includes a locking member projections 234a, 234b that are configured to interact with a locking member receptacle that is formed in the inner surface of the external male side walls 281b, 281d. It should be understood that the male locking means 256 may include a different arrangement, combination, or number of components. For example, male locking means 256 may include structures that utilize magnetic forces, spring forces, material biasing forces, compression force or a combination of these forces.

Figure 11:
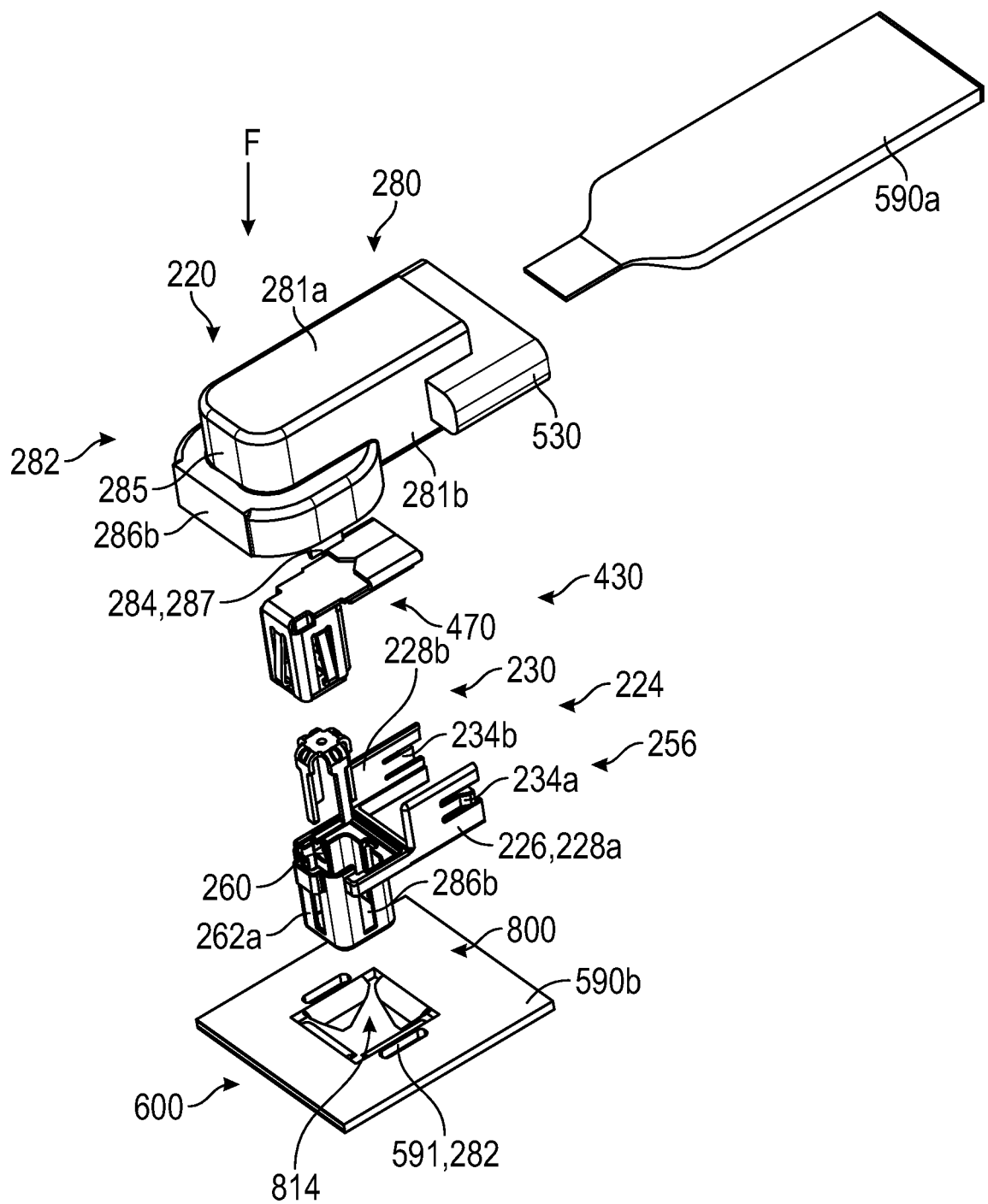
FIG. 11 is an exploded view of the busbar system of FIG. 10.

As shown in FIG. 11, the receptacle 260 is formed from an arrangement of terminal receptacle side walls 262a-262d and a terminal receptacle front wall 264. The receptacle 260 is configured to snugly receive a majority of the male terminal assembly 430. This configuration provides additional rigidity to the male terminal assembly 430 and limits the exposed amount of the male terminal assembly 430. However, the entire male terminal assembly 430 is not encased by the housing 224. Thus, to facilitate the coupling of the male terminal 430 to the female terminal 800, the side walls 262a-262d each have male terminal openings 268a-268d therethrough. The male terminal openings 268a-268d are disposed through an intermediate portion of the side walls 262a-262d and are configured to permit an extent of the male terminal assembly 430 to extend through or past the side walls 262a-262d to enable the male terminal assembly 430 to contact the female terminal 800. The male terminal openings 268a-268d may be configured such that they are not large enough to accept the insertion of an assembler's finger, a probe, or another foreign body.

It should be understood that the further the male terminal assembly 430 extends past the outer surface 274, there is a greater chance that male terminal assembly 430 will accidentally come into contact within a foreign body. Thus, the extent of the male terminal assembly 430 that extends past the outer surface 274 needs to balance the ability to form a proper connection with the female terminal 800. The design disclosed herein balances these factors and the extent of the male terminal assembly 430 extends beyond the outer surface 274 by less than 2 mm and preferably less than 0.5 mm In comparison to the length of the male terminal openings 268a-268d, the extent of the male terminal assembly 430 extends beyond the outer surface 274 is less than 8% of the length and preferably less than 4% of the length.

The internal male housing 224 is configured to be placed in contact with the male terminal assembly 430; thus, it is desirable to form the internal male housing 224 from a non-conductive material. It should be understood that the non-conductive material that is chosen should be able to sufficiently isolate the terminal assembly 430, even when a high current load is flowing through the terminal assembly 430. As discussed above and in other parts of this application, the internal male housing 224 may be formed using any suitable method, such as injection molding techniques, 3D printing, cast, thermoformed, or any other similar technique.

In other embodiments, the configuration of the receptacle 260 and the male terminal openings 268a-268d may have a different configuration to accommodate a different shaped male terminal assembly 430. For example, the receptacle 260 may have an elongated rectangular configuration to accept the male terminal assemblies shown and described within FIGS. 59-68 of PCT patent application PCT/US2019/036010. Also, in this embodiment from PCT patent application PCT/US2019/036010, the terminal receiver will not have male terminal openings positioned within an intermediate portion of side walls because the side walls do not have contact arms. Alternatively, the receptacle 260 may have a substantially circular configuration to accept the male terminal assemblies shown and described within FIGS. 87-96 of PCT patent application PCT/US2019/036010. In further embodiments, the receptacle 260 may be triangular, hexagonal or any other shape.

C. Male Terminal Assembly

FIGS. 11-14, 16-17, 22, and 27-28, provide various views of the male terminal assembly 430 for this first embodiment, while other embodiments of the male terminal assembly are shown in FIGS. 32-38. Referring specifically to the first embodiment, the male terminal assembly 430 includes a spring member 440b and a male terminal 470. The male terminal 470 includes a male terminal body 472 and a male terminal connection member or plate 474. Said male terminal body 472 includes: (i) a first or front male terminal wall 480, (ii) an arrangement of male terminal side walls 482a-482d, and (iii) a second or rear male terminal wall 484. The combination of these walls 480, 482a-482d forms a spring receiver 486. The spring member 440b includes an arrangement of spring member side walls 442a-442d and a rear spring wall 444.

Figure 12:
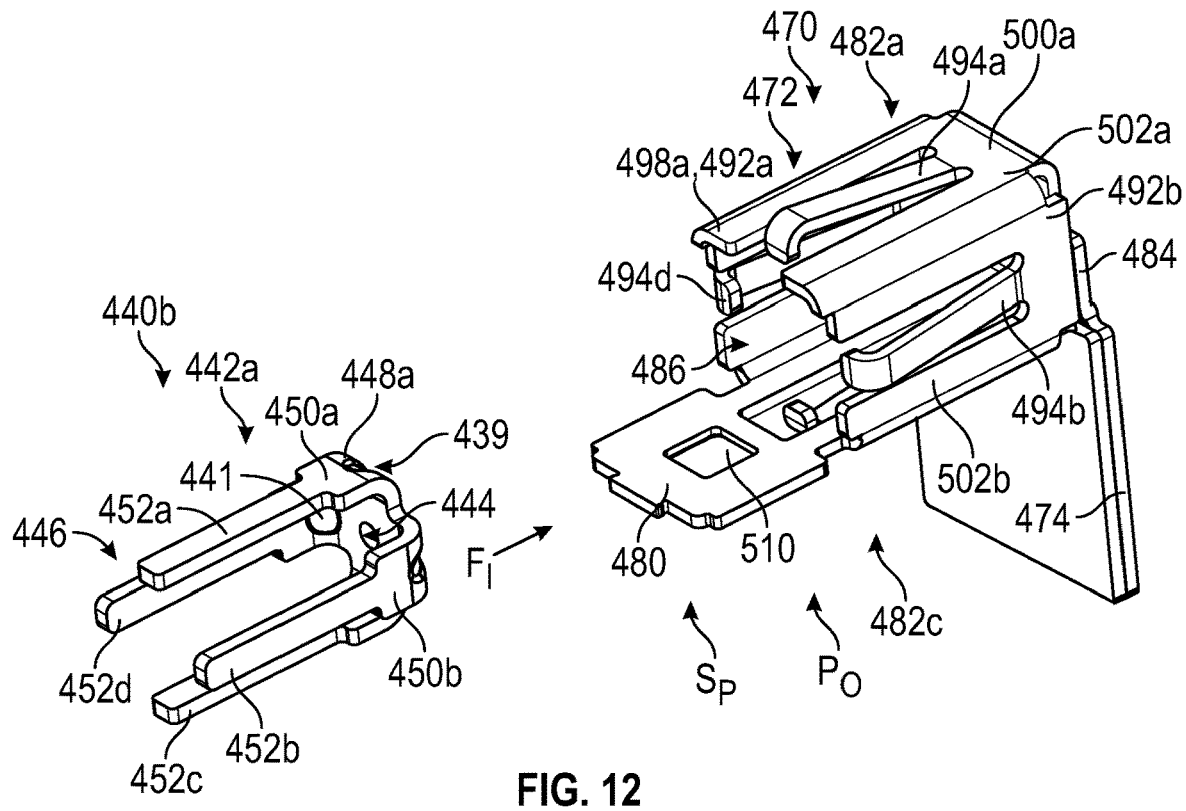
FIG. 12 is a perspective view of a male terminal assembly of the busbar system, showing a spring member separated from a male terminal of the terminal assembly.
Figure 13:
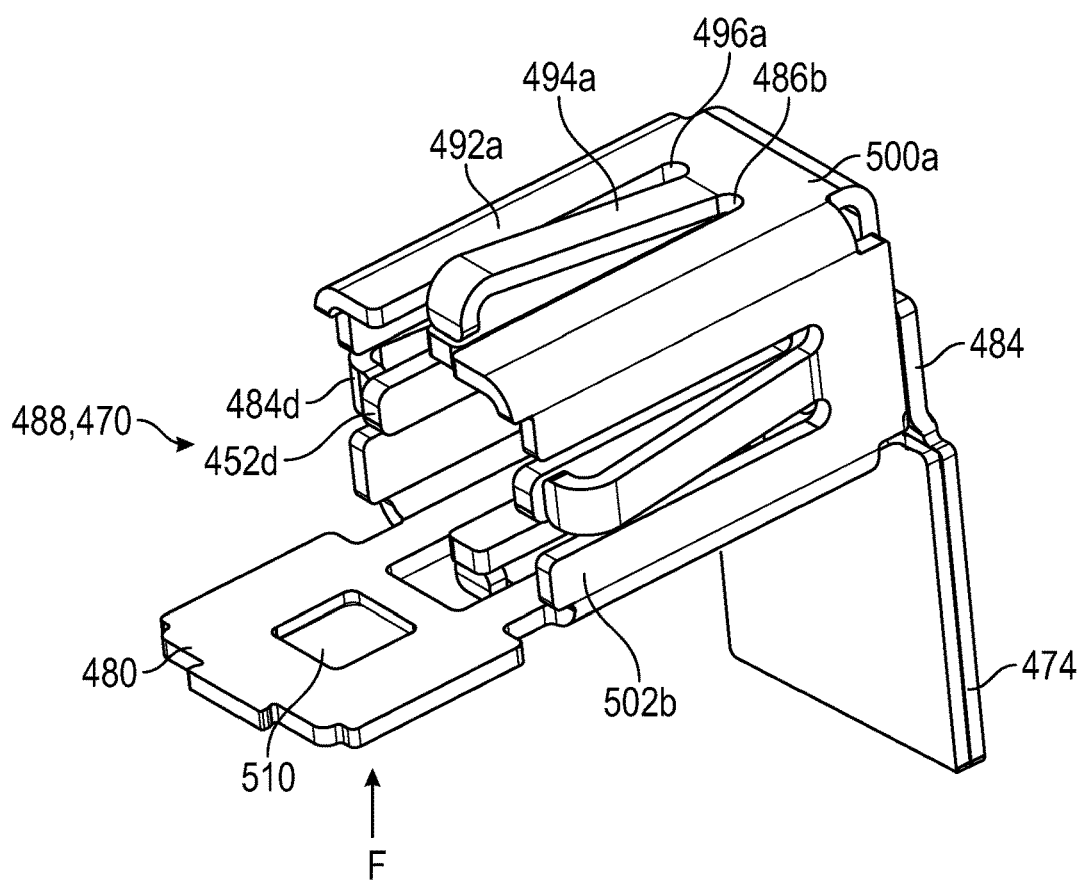
FIG. 13 is a perspective view of the male terminal assembly, showing the spring member positioned within the male terminal receiver.

Referring to FIGS. 12-13, the arrangement of spring member side walls 442a-442d each is comprised of: (i) a first or arched spring section 448a-448d, (ii) a second spring section, a base spring section, or a middle spring section 450a-450d, and (iii) a third section or spring arm 452a-452d. The arched spring sections 448a-448d extend between the rear spring wall 444 and the base spring sections 450a-450d and position the base spring sections 450a-450d substantially perpendicular to the rear spring wall 444. In other words, the outer surface of the base spring sections 450a-450d is substantially perpendicular to the outer surface of the rear spring wall 444.

The base spring sections 450a-450d are positioned between the arched sections 448a-448d and the spring arms 452a-452d. As shown in FIGS. 12-13, the base spring sections 450a-450d are not connected to one another and thus middle section gaps are formed between the base spring sections 450a-450d of the spring member 440b. The gaps aid in omnidirectional expansion of the spring arms 452a-452d, which facilitates the mechanical coupling between the male terminal 470 and the female terminal 800. The spring arms 452a-452d extend from the base spring sections 450a-450d of the spring member 440b, away from the rear spring wall 444, and terminate at the free end 446. The spring arms 452a-452d are generally coplanar with the base spring sections 450a-450d and as such the outer surface of the spring arms 452a-452d are coplanar with the outer surface of the base spring sections 450a-450d. Unlike the spring arm 31 that is disclosed within FIGS. 4-8 of PCT/US2018/019787, the free end 446 of the spring arms 452a-452d does not have a curvilinear component. Instead, the spring arms 452a-452d have a substantially planar outer surface. This configuration is beneficial because it ensures that the forces associated with the spring 440b are applied substantially perpendicular to the free end 488 of the male terminal body 472. In contrast, the curvilinear components of the spring arm 31 are disclosed within FIGS. 4-8 of PCT/US2018/019787 do not apply a force in this manner Like the base spring sections 450a-450d, the spring arms 452a-452d are not connected to one another. In other words, there are spring arm openings that extend between the spring arms 452a-452d. Due to the spring arm openings and the spring finger apertures, the individual spring fingers 452a-452d are not connected to one another or connected to a structure other than the base spring sections 450a-450d. This configuration allows for the omnidirectional movement of the spring arms 452a-452d, which facilitates the mechanical coupling between the male terminal 470 and the female terminal 800. In other embodiments, the spring arms 452a-452d may be coupled to other structures to restrict their omnidirectional expansion. The number and width of individual spring arms 452a-452d and openings may vary. In addition, the width of the individual spring arms 452a-452d is typically equal to one another; however, in other embodiments one of the spring arms 452a-452d may be wider than other spring arms.

The spring member 440b is typically formed from a single piece of material (e.g., metal). Therefore, the spring member 440b is a one-piece spring member 440b or has integrally formed features. In particular, the following features are integrally formed: (i) the rear spring wall 444, (ii) the curvilinear sections 448a-448d, (iii) the base spring sections 450a-450d, and (iii) the spring finger 452a-452d. To integrally form these features, the spring member 440b is typically formed using a die forming process. The die forming process mechanically forces the spring member 440b into shape. As discussed in greater detail below and in PCT/US2019/036010, when the spring member 440b is formed from a flat sheet of metal, installed within the male terminal 472 and connected to the female terminal 800, and is subjected to elevated temperatures, the spring member 440b applies an outwardly directed spring thermal force $S_{TF}$ on the contact arms 494a-494d due in part to the fact that the spring member 440b attempts to return to a flat sheet. However, it should be understood that other types of forming the spring member 440b may be utilized, such as casting or using an additive manufacturing process (e.g., 3D printing). In other embodiments, the features of the spring member 440b may not be formed from a one-piece or be integrally formed, but instead formed from separate pieces that are welded together.

Figure 31A:
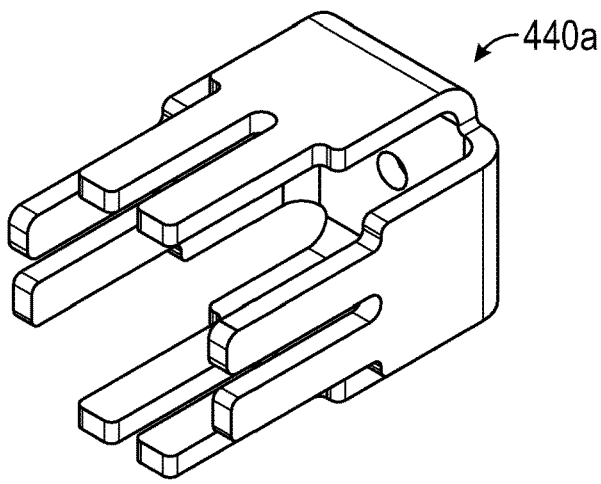
FIGS. 31A-31B show a second embodiment of a spring that may be utilized in connection with the male terminal of FIG. 33.
Figure 31B:
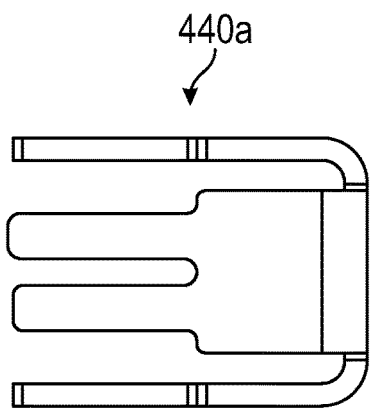
Figure 32:
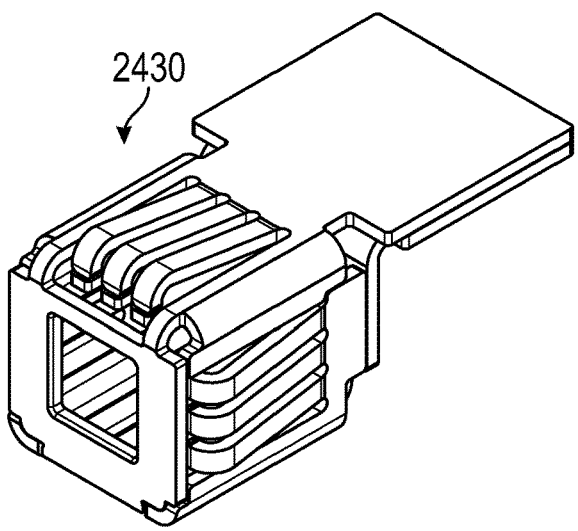
FIGS. 32-38 show alternative embodiments of male terminal assemblies that may be utilized in connection with the first and second busbar systems.
Figure 33:
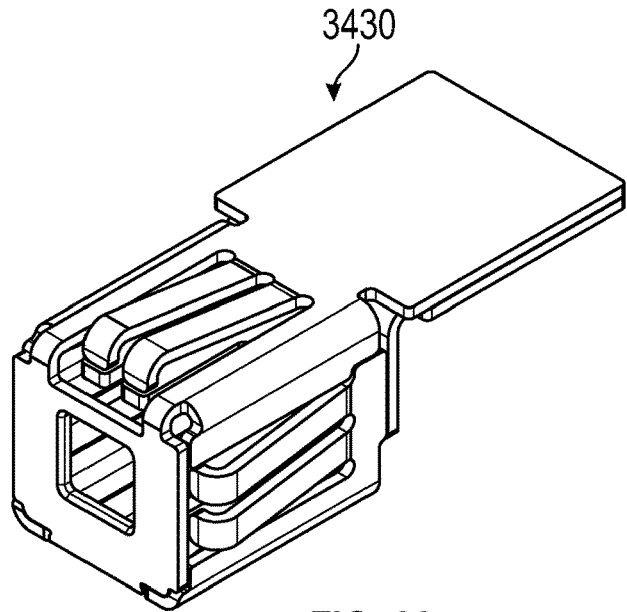
Figure 34:
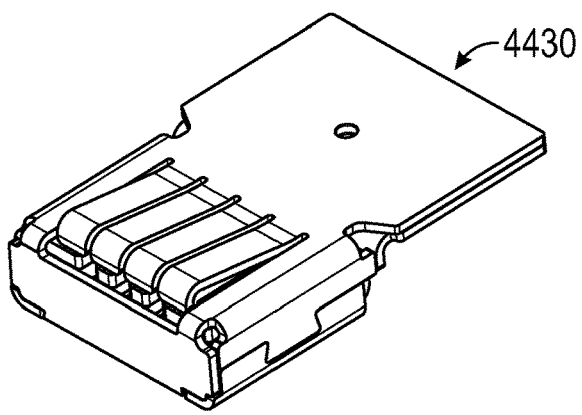
Figure 35:
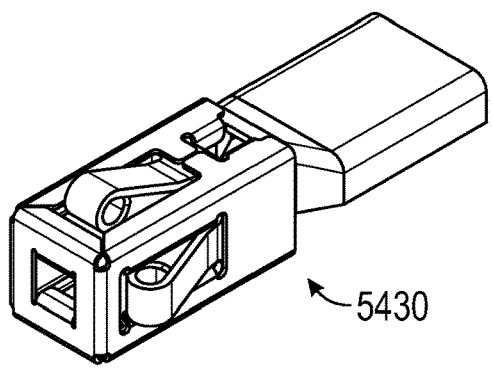
Figure 36:
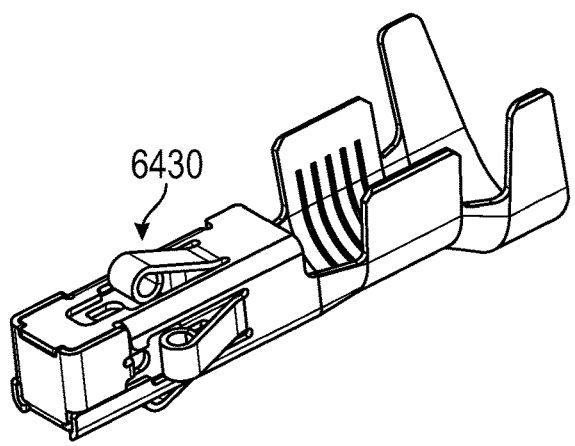
Figure 37:
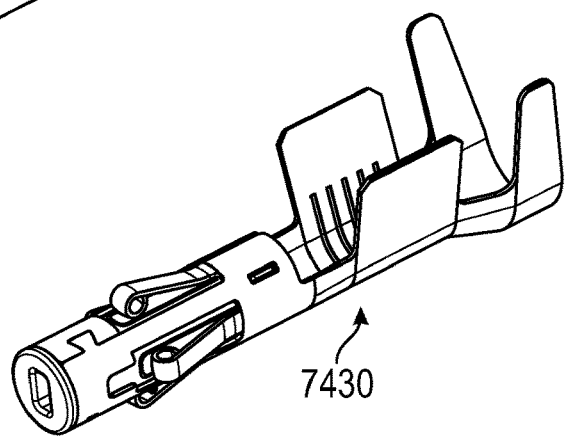
Figure 38:
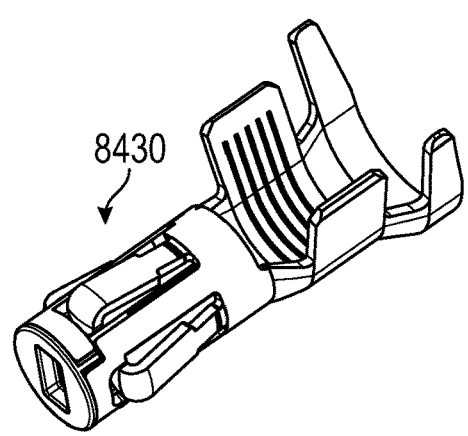

FIGS. 31A-31B show views of a different embodiment of the spring member 440a that are configured to function with a male terminal 470 that has two contact arms 494a-494d. The primary differences between the first and second embodiments include two alterations to the configuration of the spring members, wherein these alterations include the removal of: (i) recess 439 and associated strengthening rib 441 and (ii) alterations to the width of the base spring sections 450a-450d. As discussed in PCT/US2019/036010, these changes to the configuration of the spring members 440b alter the forces that are associated with the spring 440b. In particular, the spring biasing force $S_{BF}$ is the amount of force that is applied by the spring member 440b to resist the inward deflection of the free end 446 of the spring member 440b when the male terminal assembly 430 is inserted within the female terminal 800. Specifically, this inward deflection occurs during the insertion of the male terminal assembly 430 due to the fact that an extent of an outer surface of the male terminal body 472 is slightly larger than the interior of the female terminal 800. Thus, when the male terminal assembly 430 is inserted into the female terminal 800, the extent of the outer surface is forced towards the center 490 of the male terminal 470. This inward force on the outer surface displaces the free end 446 of the spring member 440b inward (i.e., towards the center 490). The spring member 440b resists this inward displacement by providing a spring biasing force SBF.

FIGS. 4, 11, 14, 16-17, and 22 show the first embodiment of the male terminal 470. As discussed above, the first embodiment of the male terminal 470 includes the male terminal body 472 and a male terminal connection plate 474. Specifically, the male terminal connection plate 474 is coupled to the male terminal body 472 and is configured to receive an extent of the busbar body 590a, as shown in FIGS. 17 and 27. The male busbar body 590a is typically welded to the connection plate 474; however, other methods (e.g., forming the male busbar body 590a as a part of the connection plate 474) of connecting the male busbar body 590a to the connection plate 474 are contemplated by this disclosure. For example, the connection plate 474 may include a secondary piece that is configured to form a locking receiver when an extent of the male busbar body 590a is placed within this receiver. The busbar body 590a is mechanically and electrically connected to the interconnecting busbar segment 98. In some embodiments, the male busbar body 590a is integrally formed with the interconnecting busbar segment 98. Integrally forming the male busbar body 590a with the interconnecting busbar segment 98 allows a designer/fabricator to form these two components from a single elongated pre-manufactured busbar. For example, the male busbar body 590a may contain the mounting portion 593 and a small extent of the plurality of solid conductors, whereas the interconnecting busbar segment 98 only includes the plurality of solid conductors and a protective coating 594.

As shown in FIGS. 4, 11, 14, 16-17, and 22, the arrangement of male terminal side walls 482a-482d are coupled to one another and generally form a rectangular prism. The arrangement of male terminal side walls 482a-482d includes: (i) a side wall portion 492a-492d, which generally has a "U-shaped" configuration, (ii) contact arms 494a-494d, and (iii) a plurality of contact arm openings 496a-496h. As best shown in FIGS. 12-13, the side wall portions 492a-492d are substantially planar and have a U-shaped configuration. The U-shaped configuration is formed from three substantially linear segments, wherein a second or intermediate segment 500a-500d is coupled on one end to a first or end segment 498a-498d and on the other end to a third or opposing end segment 502a-502d. The contact arms 494a-494d extent: (i) from an extent of the intermediate segment 500a-500d of the side wall portion 492a-492d, (ii) away from the rear male terminal wall 484, (iii) across an extent of the contact arm openings 496a-496h, and (iv) terminate just short of the front male terminal wall 480. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 470 can be installed in narrower, restrictive spaces, (ii) has a higher current carrying capacity, (iii) is easier to assemble, (iv) improved structural rigidity because the contact arms 494a-494d are positioned inside of the first male terminal side wall portion 492a-492d, (iv) benefits that are disclosed in connection with PCT/US2019/036010, and (v) other beneficial features that are disclosed herein or can be inferred by one of ordinary skill in the art from this disclosure.

The arrangement of contact arm openings 496a-496h is integrally formed with the intermediate portion 500a-500d of the male terminal side walls 482a-482d. The contact arm openings 496a-496h extend along the lateral length of the contact arms 494a-494d in order to create a configuration that permits the contact arms 494a-494d not to be laterally connected to: (i) another contact arm 494a-494h or (ii) a structure other than the extent of the male terminal side wall portion 492a-492d to which the contact arms 494a-494d are coupled thereto. Additionally, the contact arm openings 496a-496h are aligned with the spring arm openings. This configuration of openings forms the same number of spring arms 452a-452d as the number of contact arms 494a-494d. In other words, FIGS. 12-13 show four spring arms 452a-452d and four contact arms 494a-494d. Additionally, these figures show that the width of the spring arms 452a-452d substantially matches the width of the contact arms 494a-494d. It should be understood that in other embodiments, the number of spring arms 452a-452d may not match the number of contact arms 494a-494d. For example, there may be fewer one spring arms 452a-452d.

The contact arms 494a-494d extend away from the rear male terminal wall 484 at an outward angle. In particular, the outward angle may be between 0.1 degree and 16 degrees between the outer surface of the extent of the male terminal side wall 492a-492d and the outer surface of the first extent of the contact arms 494a-494d, preferably between 5 degrees and 12 degrees and most preferably between 7 degrees and 8 degrees. This outward angle is shown in multiple figures, but may be best visualized in connection with FIGS. 16-17 and 27-28. This configuration allows the contact arms 494a-494d to be deflected or displaced inward and towards the center 490 of the male terminal 470 by the female terminal 800, when the male terminal assembly 430 is inserted into the female terminal 800. This inward deflection is best shown in FIGS. 16-17 and 27-28 and other figures contained within PCT/US2019/036010. This inward deflection helps ensure that a proper mechanical and electrical connection is created by ensuring that the contact arms 494a-494d are placed in contact with the female terminal 800.

Figure 14:
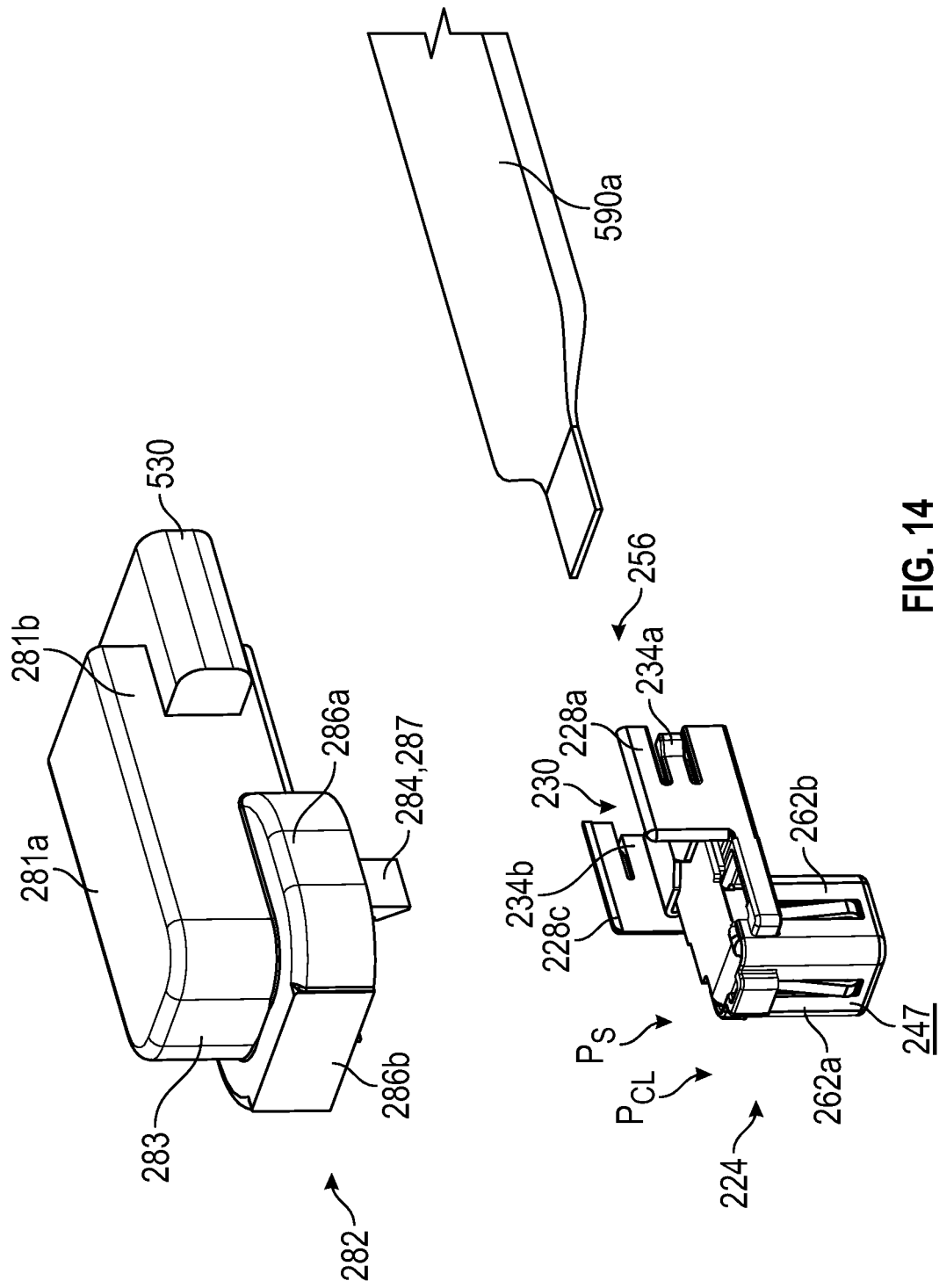
FIG. 14 is a perspective view of the busbar system of FIG. 10 in a seated state.

As shown in FIGS. 11, 14, the terminal ends of the contact arms 494a-494d are positioned: (i) within an aperture formed by the U-shaped side wall portions 492a-492d, (ii) within the spring receiver 486, (iii) substantially parallel to the male terminal side wall 492a-492d, and (iv) in contact the planar outer surface of the spring arms 452a-452d, when the spring member 440b is inserted into the spring receiver 486. This configuration is beneficial over the configuration shown in FIGS. 3-8 in PCT/US2018/019787 because the assembler of the male terminal assembly 430 does not have to apply a significant force in order to deform a majority of the contact arms 494a-494d outward to accept the spring member 440b. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/019787, FIGS. 13, 16-17, and 27-28 of the present application show a gap that is formed between the outer surfaces of the spring member 440b and the inner surface of the contact arms 494a-494d. Accordingly, very little force is required to insert the spring member 440b into the spring receiver 486 due to the fact the assembler does not have to force the contact arms 494a-494d to significantly deform during the insertion of the spring 440a.

The male terminal 470 is typically formed from a single piece of material (e.g., metal). Therefore, the male terminal 470 is a one-piece male terminal 470 and has integrally formed features. To integrally form these features, the male terminal 470 is typically formed using a die-cutting process. However, it should be understood that other types of forming the male terminal 470 may be utilized, such as casting or using an additive manufacturing process (e.g., 3D printing). In other embodiments, the features of the male terminal 470 may not be formed from a one-piece or be integrally formed, but instead formed from separate pieces that are welded together. In forming the male terminal 470, it should be understood that any number (e.g., between 1 and 100) of contact arms 494a-494d may be formed within the male terminal 470.

Positioning the spring member 440b within the male terminal assembly 430 occurs across multiple steps or stages. FIG. 12 provides the first embodiment of the male terminal assembly 430 in a disassembled state $S_D$, while FIG. 13 provides the first embodiment of the male terminal assembly 430 in a partially assembled state $S_P$ and FIGS. 14, 16, and 17 provide the first embodiment of the male terminal assembly 430 in an assembled state $S_A$. The first stage of assembling the male terminal assembly 430 is shown in FIG. 12, where the front male terminal wall 480 is in an open or flat position $P_O$ and the spring member 440b is separated from the male terminal 470 In this open position $P_O$ the front male terminal wall 480 is substantially co-planar with the male terminal side wall 482c. This configuration of the male terminal 470 exposes the spring receiver 486 and places the male terminal 470 in a state that is ready for receiving the spring member 440b. The second stage of assembling the male terminal assembly 430 is shown, where the front male terminal wall 480 is in an open or horizontal position $P_O$ and the spring member 440b is positioned within or inserted into the spring receiver 486. To reach the inserted state, an insertion force, $F_I$, has been applied to the spring member 440b to insert the spring member 440b into the spring receiver 486. The insertion force, $F_I$, is applied on the spring member 440b until the second or rear male terminal wall 484 is positioned adjacent to the rear spring wall 444, a free end 488 of the male terminal 470 is substantially aligned with a free end 446 of the spring member 440b, and a portion of the male terminal side walls 482a-482d are positioned adjacent a portion of the spring member side walls 442a-442d.

The third stage of assembling the male terminal assembly 430 is shown in FIG. 8, where: (i) the front male terminal wall 480 is closed or vertical $P_{CL}$ and (ii) the spring member 440b is positioned within the spring receiver 486. To close the front male terminal wall 480, an upward directed force is applied to the male terminal wall 480 to bend it about its seam to place it adjacent to the side walls 482a-482d. After the front male terminal wall 480 is in the proper position, the top edge is coupled (e.g., welded) to the side wall 480 of the male terminal body 472. Here, the closed or vertical $P_{CL}$ of the front male terminal wall 480 ensures that the spring member 800 is retained within the male terminal 470. It should be understood that in other embodiments, the front male terminal wall 480 may be omitted, may not have a touch proof probe opening 510 therethrough, may not extend the entire way from side wall 482a-482d (e.g., partially extending from any side wall 482a-482d), or may be a separate piece that is coupled to both side walls 482a-482d.

After the third stage of assembling the male terminal assembly 430 is accomplished, the male terminal assembly 430 can be positioned within the internal housing 224 to place the male busbar assembly 200 in a seated position $P_S$, as shown in FIG. 14. The male terminal assembly 430 may be retained within the internal housing 224 by a retaining means, which is not shown. However, exemplary retaining means that could be integrated into the internal housing 224 are described in detail within PCT/US2020/13757 and PCT/

US2019/36070. After the male busbar assembly 200 is in a first partially assembled state $P_1$, the internal housing 224 is positioned within the external housing 280. The coupling of the internal and external housings 224, 280 are discussed above. Once the housings 224, 280 are coupled together, the male busbar assembly 200 is in a fully seated position $P_{FS}$, which is shown in FIGS. 16-17.

III. Coupling of the Male Connector Assembly with the Female Connector Assembly

Figure 15:
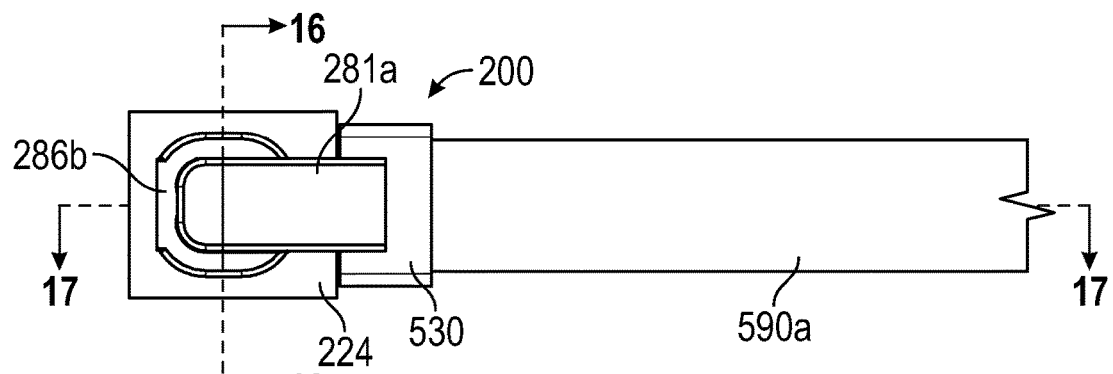
FIG. 15 is a top view of the busbar system of FIG. 10.
Figure 16:
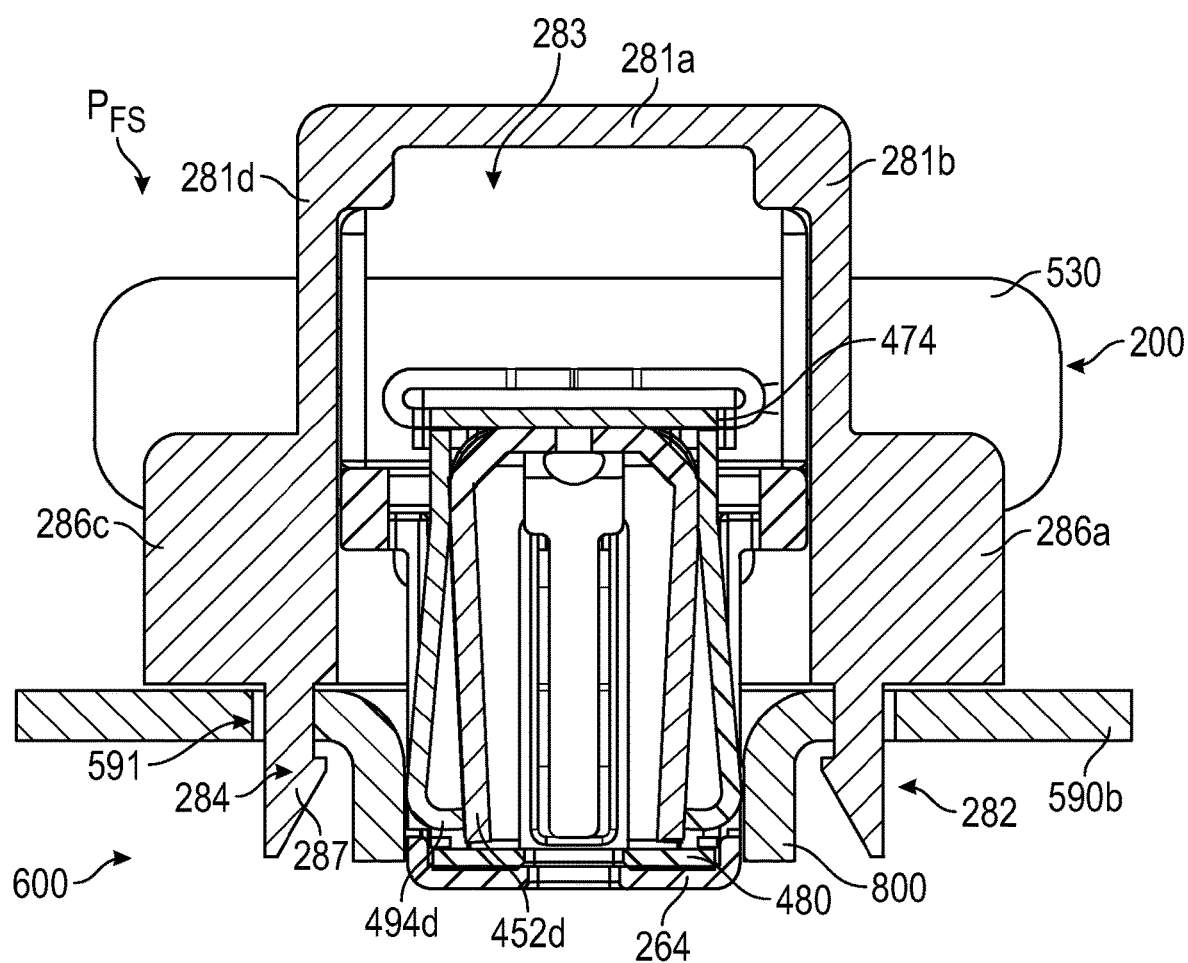
FIG. 16 is a cross-sectional view of the busbar system taken along line 16-16 of FIG. 15.
Figure 17:
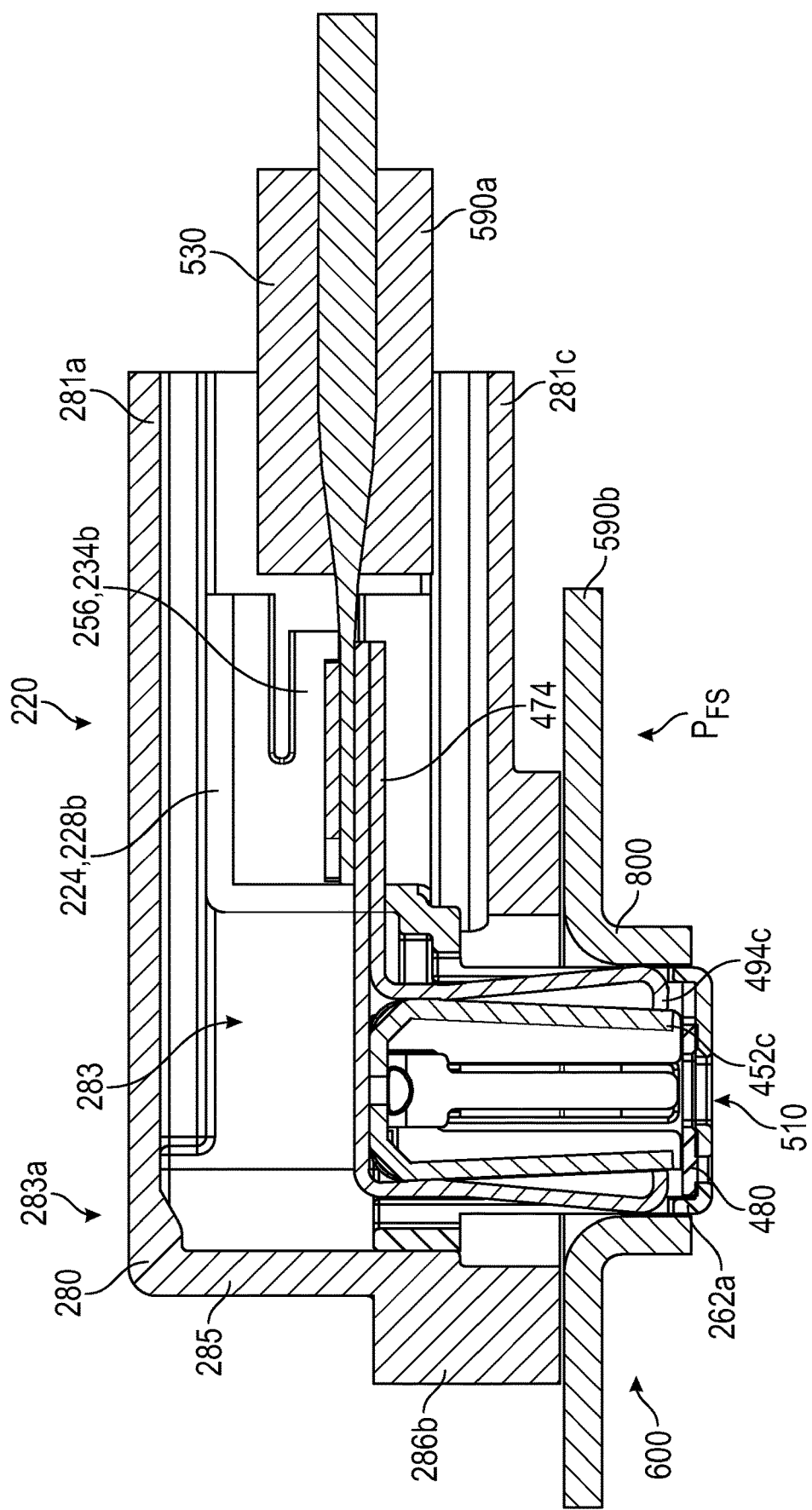
FIG. 17 is a cross-section view of the busbar system taken along line 17-17 of FIG. 15.
Figure 18:
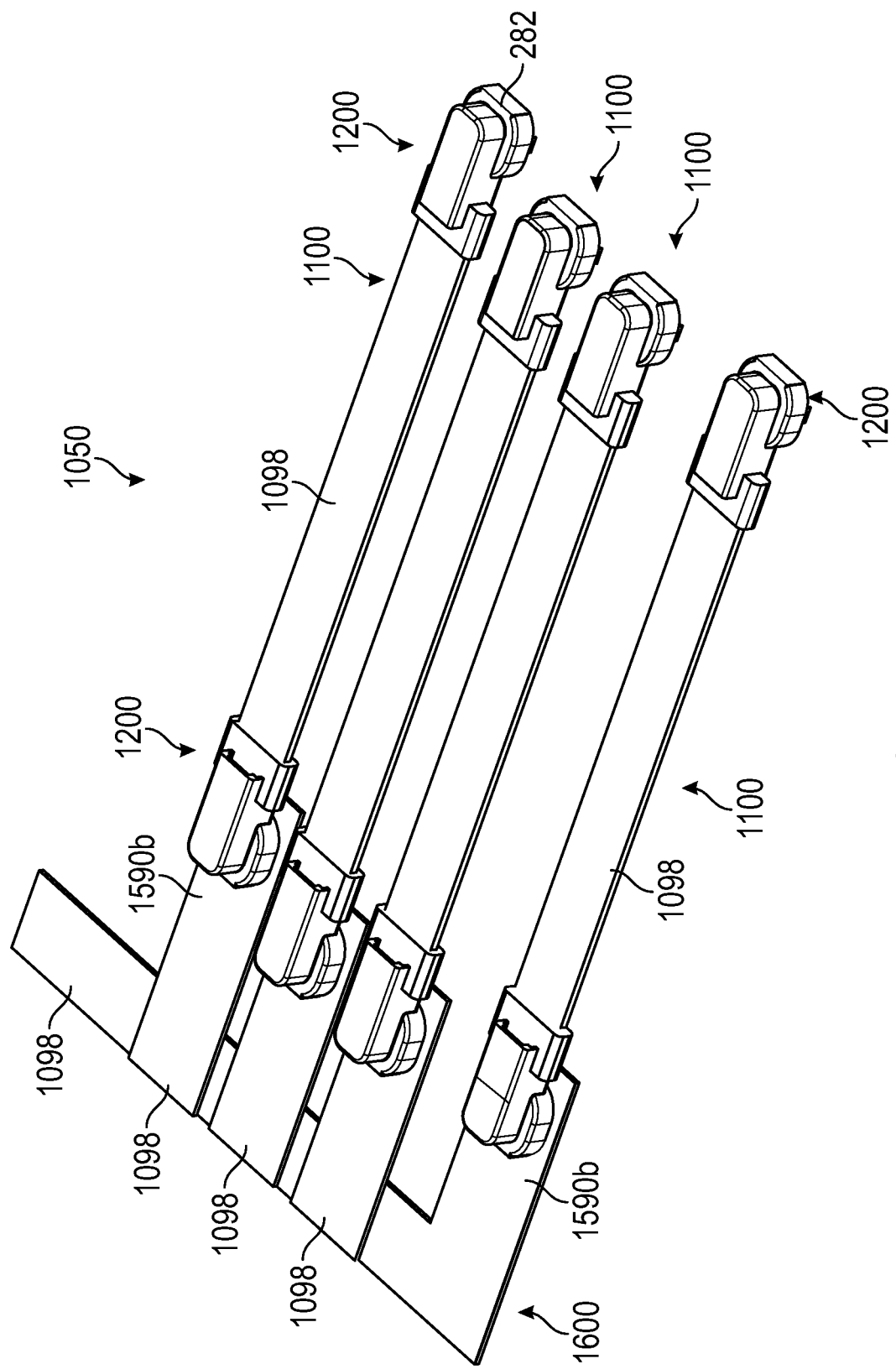
FIG. 18 is a top perspective view of a second embodiment of the power distribution assembly that includes multiple interconnected busbar systems.
Figure 19:
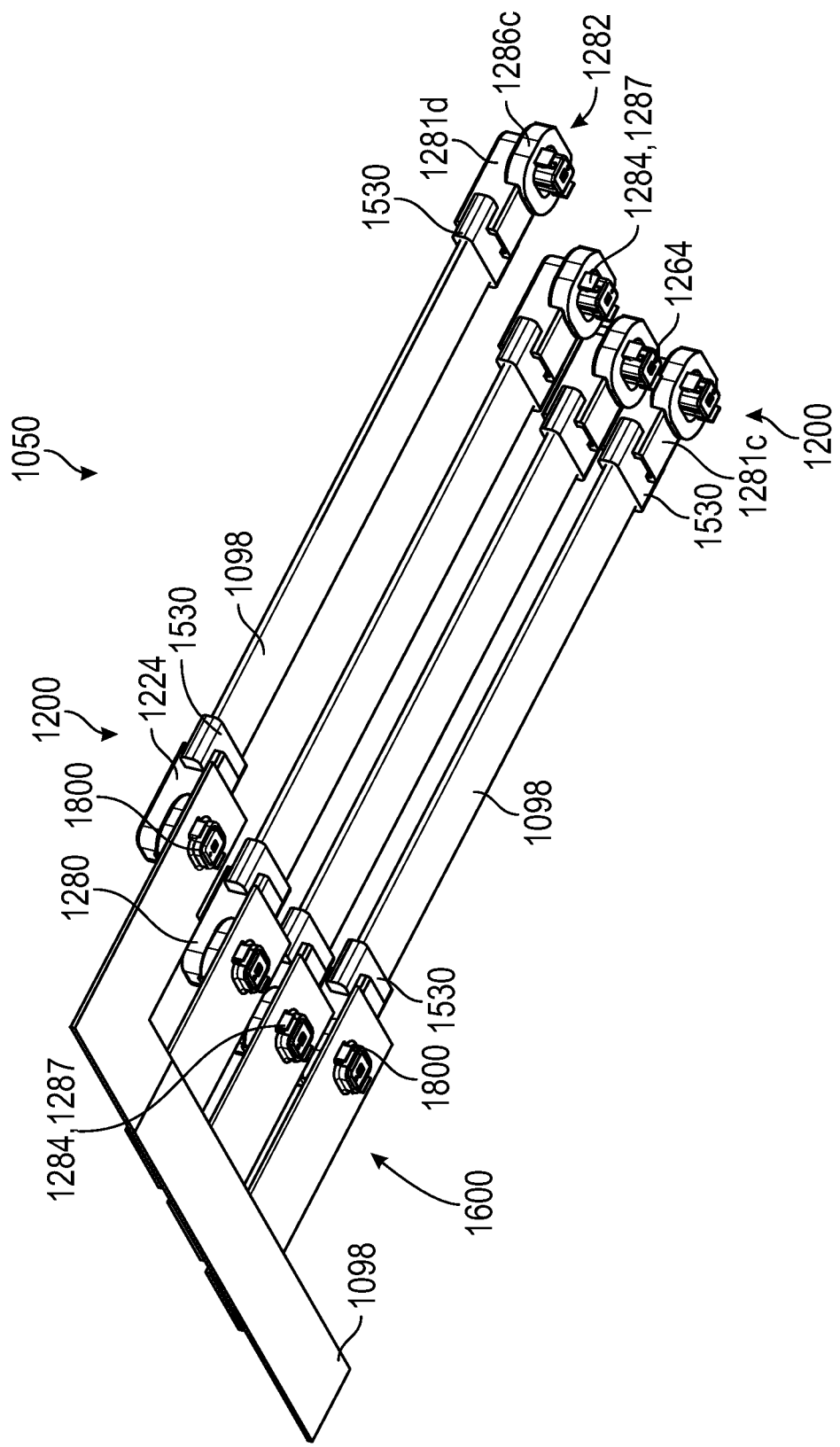
FIG. 19 is a bottom perspective view of the second embodiment of the power distribution assembly of FIG. 18.
Figure 20:
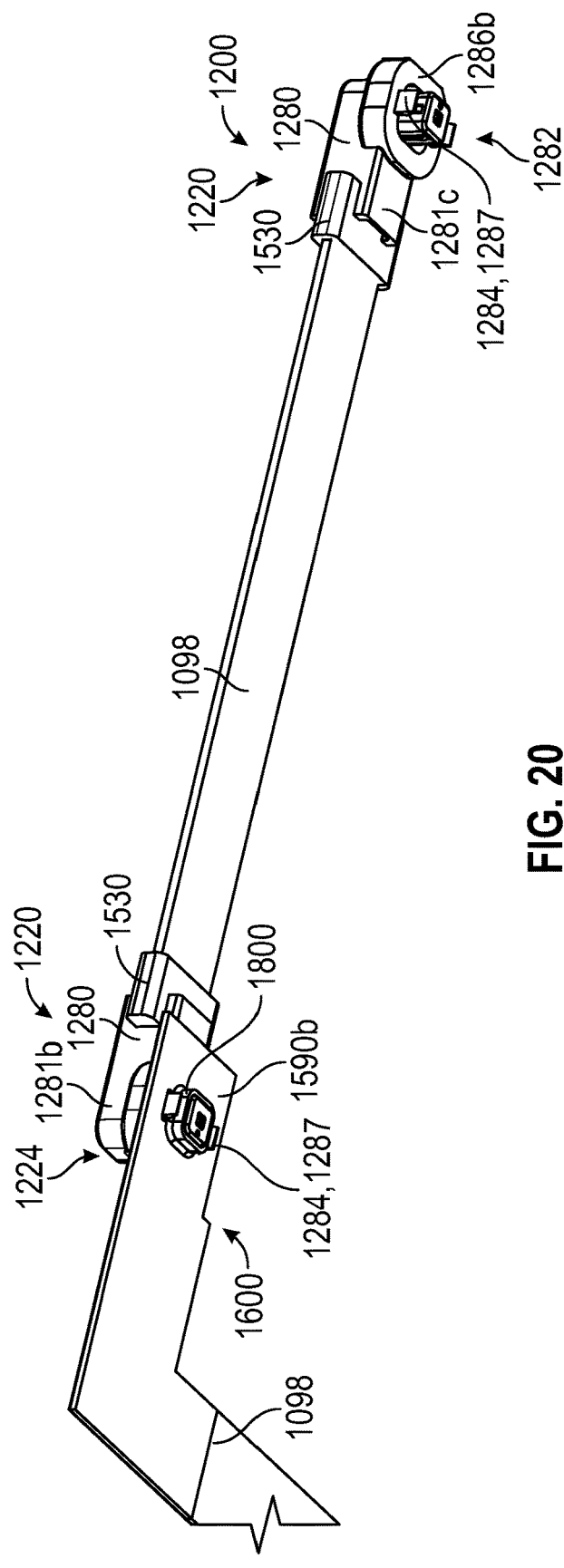
FIG. 20 is a bottom perspective view of the second embodiment of the power distribution assembly of FIG. 18, where the power distribution assembly includes two interconnected busbar systems.
Figure 21:
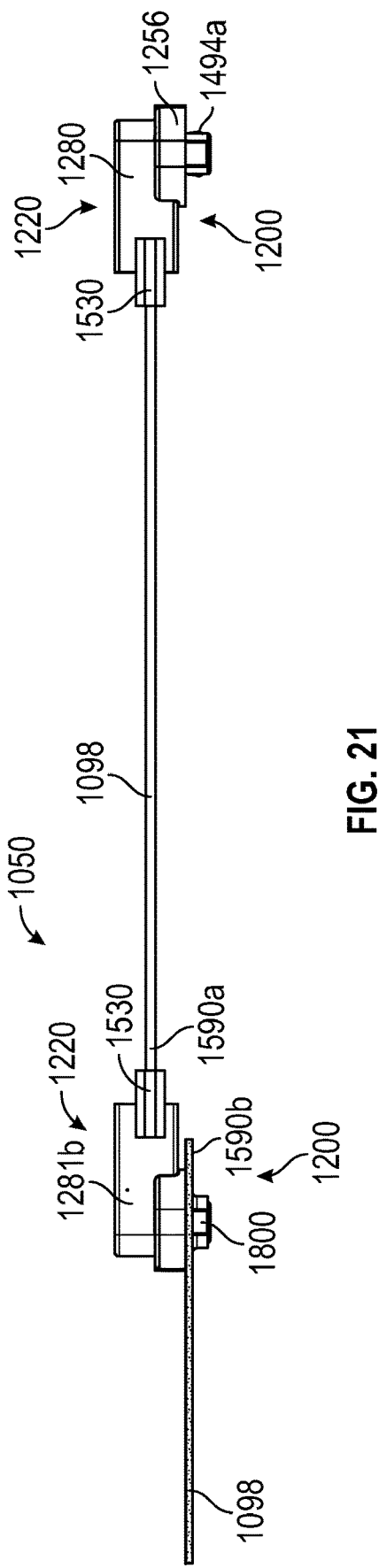
FIG. 21 is a side view of the second embodiment of the power distribution assembly of FIG. 18.
Figure 22:
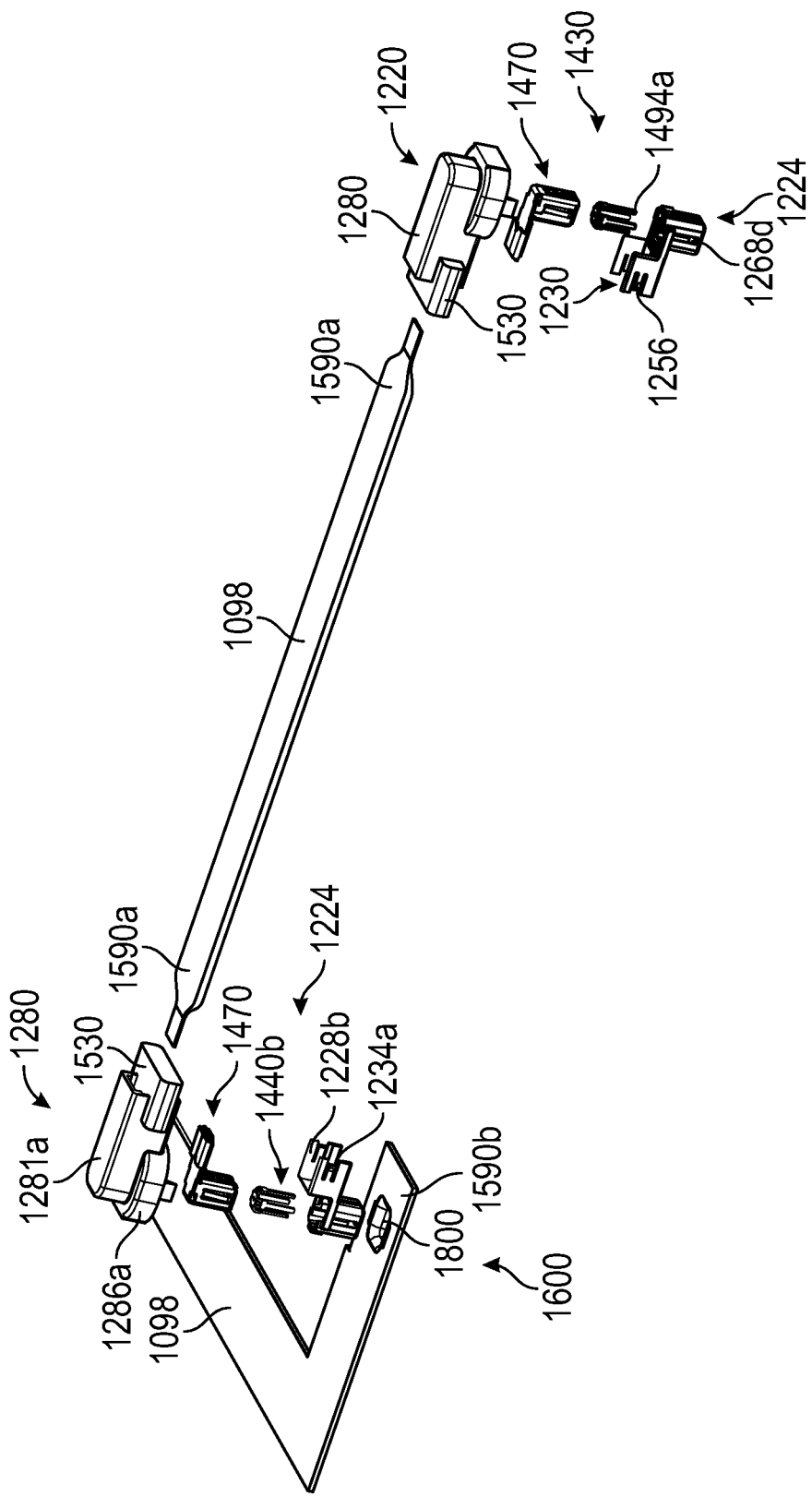
FIG. 22 is an exploded view of the second embodiment of the power distribution assembly of FIG. 18.
Figure 24:
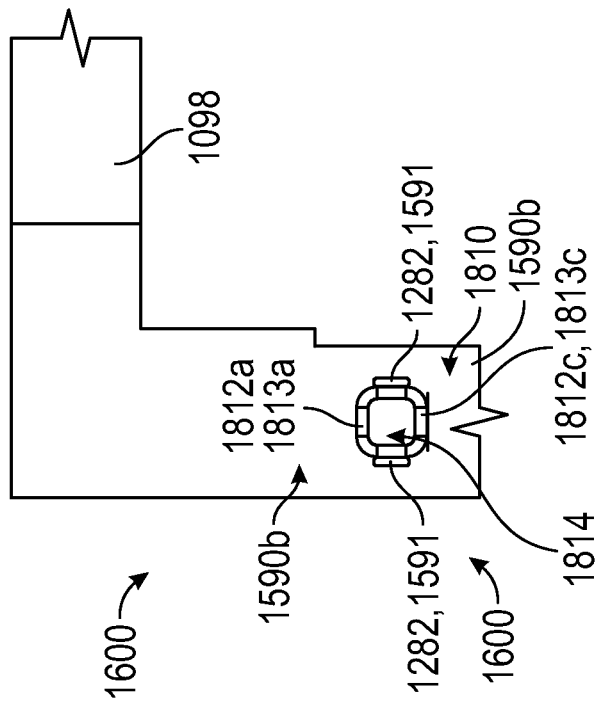
FIG. 24 is a top view of the female busbar assembly of FIG. 23.
Figure 23:
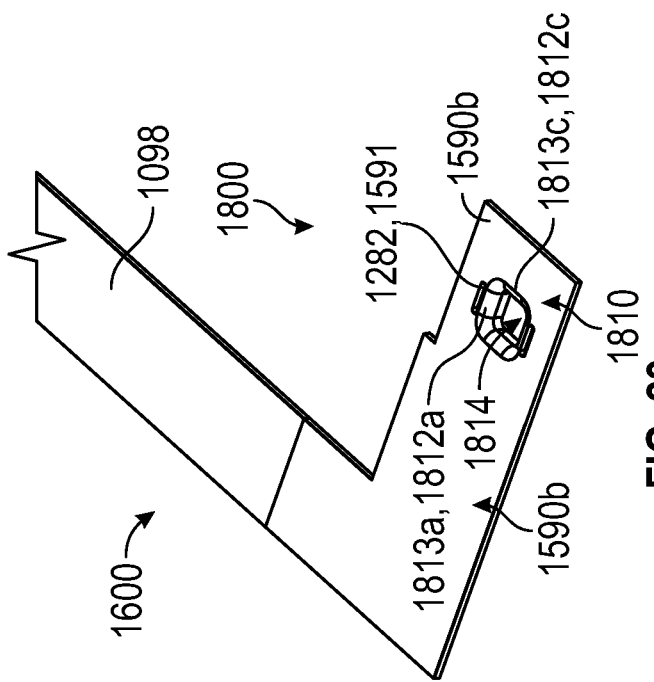
FIG. 23 is a perspective view of a female busbar assembly of the power distribution assembly of FIG. 18, showing a female terminal assembly and a female busbar body.
Figure 25:
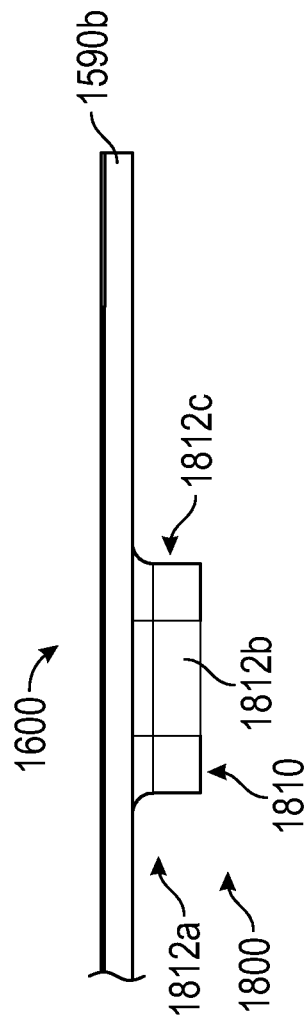
FIG. 25 is a side view of the female busbar assembly of FIG. 23.
Figure 26:
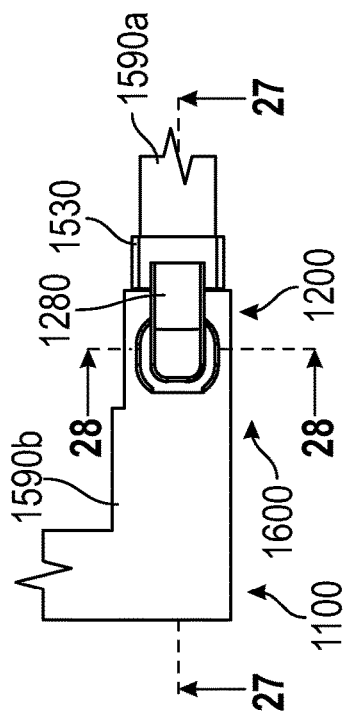
FIG. 26 is a top view of the busbar system of the power distribution assembly of FIG. 18.

FIGS. 15-17 shows the coupling of the male busbar assembly 200 with the female busbar assembly 600. Specifically, the connector assemblies 200, 600 starts in a separated or disengaged position $P_D$ where the connector assemblies 200, 600 are not in mechanical or electrical contact with one another. From the disengaged state $P_D$ the assembler applies a coupling force, $F_C$, on the male busbar assembly 200 to force the male busbar assembly 200 towards the female busbar assembly 600. This coupling force $F_C$ displaces the connector assemblies 200, 600 into an intermediate position $P_I$ where: (i) the busbar projection 284 is in contact with the female coupling holes 591, and (ii) the contact arms 494a-494d are placed in contact with the arched side walls 813a-813d of the female terminal 800. However, in the intermediate position $P_I$, the male busbar assembly 200 is not mechanically or electrically coupled to the female busbar assembly 600 because of the assemblies 200, 600 are not fully engaged with each other.

From the intermediate position $P_I$ the assembler continues to apply the coupling force $F_C$ on the male busbar assembly 200 to displace the male busbar assembly 200 towards the female busbar assembly 600 and then into a connected position $P_C$ (see FIGS. 15-17). As the connector assemblies 200, 600 move from the intermediate position Pi to connected position $P_C$, the contact arms 494a-494d are compressed inward or towards the center 490 of the male terminal 470. The inward compression of the contact arms 494a-494d in turn causes the spring arms 452a-452d to deform inward towards the center 490 of the male terminal 470. As discussed above, the spring member 440b resists this inward compression and applies an outwardly directed spring biasing force on the contact arms 494a-494d. In the connected position $P_C$, the male busbar assembly 200 is mechanically and electrically coupled to the female busbar assembly 600 without the use of conventional bolt and eyelet fasteners.

A. Terminals

FIGS. 3-17 depict various views of the male terminal assembly 430 and the female terminal 800, while FIGS. 18-30 disclose a second embodiment of a busbar system 1100. The second embodiment of the busbar system 1100 is very similar to the first embodiment of the busbar system 100, except for the female terminal 1800 is formed using a different method. Thus, for the sake of brevity, the above disclosure in connection with the busbar system 100 will not be repeated below. However, it should be understood that numbers that are separated by 1000 represent like structures and components. For example, the disclosure relating to male terminal assembly 430 applies in equal force to male terminal assembly 1430.

Due to the similarities between the first and second embodiments, the following disclosure relating to the terminals 430, 800, 1430, 1800 applies in equal force to both embodiments. Specifically, referring to FIGS. 29-30, the combination of outer surfaces of the contact arms 1494a-1494d form a rectangle that has a width/height that is slightly larger (e.g., between 0.1% and 15%) than the width/height of the rectangle that is associated with the female terminal 1800. When the slightly larger male terminal assembly 1430 is inserted into the slightly smaller female terminal receiver 1800, the outer surface of the contact arms 1494a-1494d are forced towards the center 1490 of the male terminal assembly 430. Because the outer surface of the contact arms 1494a-1494d is forced towards the center 490 of the male terminal assembly 1430, the free end 1446 of the spring member 1440b are also forced towards the center 1490 of the male terminal assembly 1430. The spring 1440a resists this inward displacement by providing a spring biasing force $S_{BF}$ (as depicted by the arrows labeled "$S_{BF}$" in FIG. 30). This spring biasing force $S_{BF}$ is generally directed outward against the free ends 1488 of the male terminal 1470. In other words, this spring biasing force $S_{BF}$ provides a wedging or shimmering effect against the contact arms 1494a-1494d thereby holding the outer surfaces of the contact arms 1494a-1494d in engagement with the female terminal 800.

The Figures show that the busbar system 100 provides a connection that is omnidirectional and 360° compliant, which meets a certain car or automotive specifications. As shown in this embodiment, the contact arms 1494a-1494d are symmetrical and evenly spaced. The busbar system 100 is 360° compliant because the outer surface of the contact arms 1494a-1494d are in contact with each side wall 1482a-1482d of the female terminal 800 and the spring biasing force $S_{BF}$ applies out a force that is generally directed outward from the center 1490 in all four primary directions (e.g., up, down, left, and right). The 360° compliance attribute of the busbar system 100 aids in maintaining mechanical and electrical connections under strenuous mechanical conditions, e.g., vibration. In a conventional blade or fork-shaped connectors, i.e., connection on only two opposing sides, vibration may develop a harmonic resonance that causes the connector to oscillate with greater amplitude at specific frequencies. For example, subjecting a fork-shaped connector to harmonic resonance may cause the fork-shaped connector to open. The opening of the fork-shaped connector during electrical conduction is undesirable because the momentary mechanical separation of the fork-shaped connector from an associated terminal may result in electrical arcing. Arcing may have significant negative effects on the terminal as well as the entire electrical system of which the terminal is a component. However, the 360° compliance feature of the present disclosure may prevent catastrophic failures caused by strong vibration and electrical arcing.

The male terminal 1470, including the contact arms 1494a-1494d, may be formed from a first material such as copper, a highly-conductive copper alloy (e.g., C151 or C110), aluminum, and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% IACS. In certain operating environments or technical applications, it may be preferable to select C151 because it has anti-corrosive properties desirable for high-stress and/or harsh weather applications. The first material for the male terminal 1470 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius). The spring member 1400a, 1400b may be formed from a second material such as spring steel, stainless steel (e.g., 301SS, ¼ hard), and/or another suitable material having greater stiffness (e.g., as measured by Young's modulus) and resilience than the first material of the male terminal 1470. The second material preferably has an electrical conductivity that is less than the electrical conductivity of the first material. The second material also has a Young's modulus that may be approximately 193 GPa at room temperature and a coefficient of terminal expansion (CTE) of approximately 17.8 ppm/degree Celsius (from 0-315 degrees Celsius) and 16.9 ppm/degree Celsius (from 0-100 degrees Celsius).

Based on the above exemplary embodiment, the Young's modulus and the CTE of the spring member 1400a, 1400b is greater than the Young's modulus and the CTE of the male terminal 1470. Thus, when the male terminal 1470 is used in a high power application that subjects the busbar system 1100 to repeated thermal cycling with elevated temperatures (e.g., approximately 150° Celsius) then: (i) the male terminal 1470 become malleable and loses some mechanical resilience, i.e., the copper material in the male terminal 1470 softens and (ii) the spring member 1400a, 1400b does not become as malleable or lose as much mechanical stiffness in comparison to the male terminal 1470. Thus, when utilizing a spring member 1440b that is mechanically cold forced into shape (e.g., utilizing a die forming process) and the spring member 1440b is subjected to elevated temperatures, the spring member 1440b will attempt to at least return to its uncompressed state, which occurs prior to insertion of the male terminals assembly 1430 within the female terminal 1800, and preferably to its original flat state, which occurs prior to the formation of the spring member 1440b. In doing so, the spring member 1400a, 1400b will apply a generally outward directed thermal spring force $S_{TF}$ (as depicted by the arrows labeled "$S_{TF}$" in FIG. 30) on the free end 1488 of the male terminal 1470. This thermal spring force $S_{TF}$ is dependent upon local temperature conditions, including high and/or low temperatures, in the environment where the system 1100 is installed. Accordingly, the combination of the spring biasing force $S_{BF}$ and the thermal spring force $S_{TF}$ provides a resultant biasing force $S_{RBF}$ that ensures that the outer surface of the contact arms 1494a-1494d are forced into contact with the inner surface of the female terminal 1800 when the male terminal 1470 is inserted into the female terminal 1800 and during operation of the system 1100 to ensure an electrical and mechanical connection. Additionally, with repeated thermal cycling events, the male terminal assembly 1430 will develop an increase in the outwardly directed resultant spring forces $S_{RBF}$ that are applied to the female terminal 800 during repeated operation of the system 100. It should be understood that additional details about the male terminal 470 and the spring 440a,b are discussed within PCT/US2020/13757, PCT/US2019/36127, PCT/US2019/36070, PCT/US2019/36010.

The busbar system 100 is a T4/V4/S3/D2/M2, wherein the system 100 meets and exceeds: (i) T4 is exposure of the system 100 to 150° C., (ii) V4 is severe vibration, (iii) S1 is sealed high-pressure spray, (iv) D2 is 200k mile durability, and (v) M2 is less than 45 newtons of force is required to connect the male busbar assembly 200 to the female busbar assembly 600. The terminal assemblies 430, 800 shown in the following figures are rated to carry at 55° C. RoA or 80° C. with a derating of 80%: (i) FIGS. 1-30 can carry 190 amps with a 16 $mm^2$ wire, 220 amps with a 25 $mm^2$ wire, 236 amps with a 35 $mm^2$ wire, 245 amps with a 50 $mm^2$ wire, (ii) FIG. 33 can carry 245 amps with a 50 $mm^2$ wire, 280 amps with a 75 $mm^2$ wire, 330 amps with a 100 $mm^2$ wire, (iii) FIG. 32 can carry 335 amps with a 100 $mm^2$ wire, 365 amps with a 150 $mm^2$ wire, 395 amps with a 200 $mm^2$ wire, (iv) FIG. 34 can carry 365 amps with a 100 $mm^2$ wire, (v) FIG. 37 can carry 88 amps with a 16 $mm^2$ wire, (vi) FIG. 35 can carry 185 amps with a 16 $mm^2$ wire and (vi) FIG. 38 can carry 225 amps with a 25 $mm^2$ wire. Additionally, other performance specifications of the system 100 disclosed herein will be obvious to one of skill in the art.

IV. Alternative Male Terminal Assemblies Shown in FIGS. 32-38

FIGS. 32-38 show alternative embodiments of the male terminal assemblies 430 that may be utilized in connection with the system 100 disclosed herein. It should be understood that these alternative embodiments have many features in common with the male terminal assembly that is disclosed herein. For example, all of these assemblies include a spring member that is positioned within a receiver. Thus, for the sake of brevity, the above disclosure in connection with the busbar system 100 will not be repeated below. Instead, additional detail about each of these assemblies is disclosed within PCT/US2019/36010, where: male terminal assembly 2430 is disclosed in connection with FIGS. 39-48, male terminal assembly 3430 is disclosed in connection with FIGS. 1-38, male terminal assembly 4430 is disclosed in connection with FIGS. 59-68, male terminal assembly 5430 is disclosed in connection with FIGS. 69-78, male terminal assembly 6430 is disclosed in connection with FIGS. 79-86, and male terminal assembly 7430 is disclosed in connection with FIGS. 87-96. It should be understood that the busbar system 100 may replace the male terminal assembly 430 described above with any one of these male terminal assemblies 2430, 3430, 4430, 5430, 6430, 7430, 8430. Accordingly, the disclosure of PCT/US2019/36010 is fully incorporated herein by reference. If such a replacement is made, it should be understood that the female terminal 800 will need to be modified to accept this alternative assembly.

MATERIALS AND DISCLOSURE THAT ARE INCORPORATED BY REFERENCE

PCT Application Nos. PCT/US2020/13757, PCT/US2019/36127, PCT/US2019/36070, PCT/US2019/36010, and PCT/US2018/019787 and U.S. patent application Ser. No. 16/194,891, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935—18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

The above disclosure may represent an improvement in the art because it provides a modular and boltless power distribution assembly 50. In one embodiment, the female terminal has a tubular configuration that is fabricated from a sheet of highly conductive copper. The highly conductive copper can be C151 or C110. One side of the sheet of highly conductive copper can be pre-plated with silver, tin, or top tin, such that the inner surface of the tubular member may be plated. The male terminal assembly includes a male terminal body and a spring member. The male terminal body has a plurality of contact arms (e.g., four contact arms). The four contact arms can be placed at 90° increments, meaning that each contact arm has one arm directly opposing a side wall of the female terminal. Each contact arm has a thickness, a termination end, and a planar surface with a length and a width.

A spring member is configured to be nested inside the male terminal body. The spring member has spring arms, a middle section, and a rear wall or base. The spring arms are connected to the middle or base section. The spring arms have a termination end, a thickness, and a planar surface with a length and width. In the illustrated embodiments, the spring member has the same number of spring arms as the contact element has contact arms. In the illustrated embodiment, the spring arms can be mapped, one-to-one, with the contact arms. The spring arms are dimensioned so that the termination end of the associated contact arm engages the planar surface of the spring arm. The spring arms of the illustrated embodiments are even in number, symmetrical, and evenly spaced. The male terminal fits inside the tubular member of the female terminal such that the contact arms engage the inner surface of the tubular member. The spring arms help ensure that the contact arms create an electrical connection with the tubular member. The termination end of the contact arm meets the planar surface of the spring arm, forcing the contact arm to form a substantially perpendicular or at least an obtuse angle with respect to the outer surface of the spring arm.

While some implementations have been illustrated and described, numerous modifications come to mind without significantly departing from the spirit of the disclosure; and the scope of protection is only limited by the scope of the accompanying claims. For example, the overall shape of the male busbar assembly 200 may be changed to: a triangular prism, a pentagonal prism, a hexagonal prism, octagonal prism, sphere, a cone, a tetrahedron, a cuboid, a dodecahedron, a icosahedron, a octahedron, a ellipsoid, or any other similar shape. While the overall shape of the male busbar assembly 200 may be altered, the shape of the male terminal assembly 430 and the female terminal 800 may not be altered to match the shape of the overall male busbar assembly 200. For example, the shape of the male busbar assembly 200 may be a hexagonal prism, while the male terminal assembly 430 and the female terminal 800 may be substantially cubic. In other embodiments, the shape of the male terminal assembly 430 may be changed to: a triangular prism, a pentagonal prism, a hexagonal prism, octagonal prism, sphere, a cone, a tetrahedron, a dodecahedron, a icosahedron, a octahedron, a ellipsoid, or any other similar shape. If the shape of the male terminal assembly 430 is altered to be any one of the above shapes, then it should be understood that the female terminal 800 may be altered to facilitate insertion, electrical connection, and extraction of the male terminal assembly 430 from the female terminal 800. Additionally, as described above, while the shape of the male terminal assembly 430 and the female terminal 800 may be altered, the overall shape of the male busbar assembly 200 may not be altered to match the shape of the male terminal assembly 430.

The busbar system 100 may have any number of male busbar assemblies 200 and female busbar assemblies 600. Each of these assemblies 200, 600, may contain multiple male terminal assemblies 430 and female terminals 800. For example, the male busbar assembly 200 may contain between 1 and 50 male terminal assemblies 430, preferably between 1 and 15 male terminal assemblies 430, more preferably between 1 and 8 male terminal assemblies 430, and most preferably between 1 and 4 male terminal assemblies 430. Likewise, the female busbar assembly 600 may contain between 1 and 50 female terminals 800, preferably between 1 and 15 female terminals 800, more preferably between 1 and 8 female terminals 800, and most preferably between 1 and 4 female terminals 800. It should be understood these male and female terminals 430, 800 may be arranged in any manner within the housing 220 and within the busbar body 590b. For example, four male terminals 430 may be organized into a cube format, wherein two terminals are on top and two terminals are positioned directly below the top two-terminal. It should further be understood that when multiple connectors are contained within the busbar system 100, the system designer may need to reduce the absolute current/voltage terminal to account for creepage.

In other embodiments, one or both of the rear spring wall 444 may be omitted. The spring member 440b may have a different configuration, such as: (i) having curvilinear shoulder disposed near the free end 446, (ii) having a wall that is positioned opposite of the rear wall and is connected to an extent of one of the spring fingers in order to limit movement of the free end 446, (iii) the width of the spring arms may be greater than the width of the middle sections, (iv) the width of the spring fingers may not match the width of the contact arms (e.g., spring fingers may be wider or narrower than the contact arms), (v) or any combination of these features.

In other embodiments, the male terminal body 472 may have a different configuration, such as: (i) the contact openings may not be linear (e.g. curvilinear), may be different lengths, may have different widths, may extend past where the contact arms intersect the side walls or may not span the entire length of each contact arm, (ii) the contact arms may not extend from the side walls at an outward angle, (iii) not gap may not be formed between the spring member and the contact arms, (iv) may be comprised of different materials (e.g., c151 is plated with (a) silver, (b) tin, (c) ss301, (d) other similar materials, or (e) a combination of a plurality of these materials).

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A busbar system to electrically connect a component with a power distribution system in a motor vehicle, the busbar system comprising:
   a male busbar assembly including:
   (i) a male terminal having a side wall arrangement defining a receiver, and wherein at least one side wall has a contact arm,
   (ii) an internal spring member dimensioned to reside within the receiver of the male terminal,
   (iii) an internal male housing having a side wall arrangement that defines an internal male housing receptacle, wherein at least one side wall has an aperture, and wherein in a seated position (a) the internal male housing receptacle receives the male terminal and the internal spring member, and (b) the aperture receives an extent of the contact arm to expose said extent of the contact arm, and
   (iv) an external male housing having a side wall arrangement that defines an external male housing receptacle, wherein in a fully seated positon the external male housing receptacle receives (a) the male terminal, (b) the internal spring member, and (c) the internal male housing; and
   a female busbar assembly including:
   (i) a female busbar body with a conductor and a female terminal, and
   (ii) a receiver formed in an extent of the female terminal, the receiver dimensioned to receive both the male terminal and the internal spring member in a connected position to secure the female busbar assembly to the male busbar assembly.

2. The busbar system of claim 1, wherein, when the busbar system moves from a partially connected position to the connected position, (a) the contact arm of the male terminal is brought into sliding engagement with an arched segment of the female terminal and (b) the contact arm is inwardly displaced as the contact arm slidingly engages with the arched segment of the female terminal.

3. The busbar system of claim 1, wherein the male terminal includes a plurality of contact arms and the internal spring member includes a plurality of spring arms,
   wherein in the connected position (i) a first spring arm exerts a first outwardly directed biasing force on a first contact arm to displace the first contact arm into engagement with the inner surface of the receiver of the female terminal, and (ii) a second spring arm exerts a second outwardly directed biasing force on a second contact arm to displace the second contact arm into engagement with the inner surface of the receiver of the female terminal, and,
   wherein the first outwardly directed biasing force is oriented in a different direction than the second outwardly directed biasing force.

4. The busbar system of claim 1, wherein in the connected position a spring arm exerts an outwardly directed biasing force on the contact arm to displace the contact arm into engagement with an inner surface of the receiver of the female terminal.

5. The busbar system of claim 4, wherein the outwardly directed biasing force applied by the spring arm on the contact arm in the connected position is increased by residual material memory and thermal expansion due to elevated temperatures experienced during use of the busbar system.

6. The busbar system of claim 4, wherein the outwardly directed biasing force applied by the spring arm on the contact arm is increased by residual material memory and thermal expansion due to the elevated temperatures and thermal cycling.

7. The busbar system of claim 1, wherein, the female terminal is formed from the female busbar body using either a punch or a drawing process.

8. The busbar system of claim 1, wherein the female busbar body is mechanically and electrically connected to an interconnecting busbar segment, said interconnecting busbar segment is rigid and is formed from a single conductor.

9. The busbar system of claim 1, wherein the male busbar assembly further includes a flexible male busbar body that includes a plurality of conductors.

10. The busbar system of claim 9, wherein the male busbar body and the female busbar body are formed from either: stainless steel, nickel, aluminum, silver, gold, copper, nickel plated copper, steel, zinc, brass, bronze, iron, lead, tungsten, lithium, or tin.

11. The busbar system of claim 9, wherein the male busbar body and the female busbar body are partially encased by a protective layer that acts as an insulator.

12. The busbar system of claim 1, wherein the male busbar assembly and the female busbar assembly can be coupled to one another by an installer without the use a separate tool.

13. The busbar system of claim 1, wherein the busbar system is PCTS compliant.

14. The busbar system of claim 1, further comprising busbar body coupling means that includes a first part that is formed within the female busbar body and a second part that extends from the external male housing; and
   wherein in the connected position, the first part receives the second part thereby coupling the external male housing to the female busbar body.

15. The busbar system of claim 1, wherein the female busbar assembly does not include an external housing that encircles the female terminal.

16. The busbar system of claim 1, wherein the busbar system is configured to couple a high voltage power source to a device while meeting the USCAR specifications.

17. The busbar system of claim 1, wherein the busbar system does not include a threaded connector.

* * * * *